(12) United States Patent
Fuji et al.

(10) Patent No.: US 6,392,970 B1
(45) Date of Patent: May 21, 2002

(54) REPRODUCING LIGHT QUANTITY CONTROL METHOD FOR OPTICAL MEMORY DEVICE, AND REPRODUCING LIGHT QUANTITY CONTROL DEVICE, AND OPTICAL RECORDING MEDIUM

(75) Inventors: Hiroshi Fuji, Soraku-gun; Shigemi Maeda, Yamatokoriyama; Tomoyuki Miyake, Nara; Yasuo Nakata, Takaichi-gun; Nobuo Ogata, Nara; Jun Akiyama, Kashihara; Toshiharu Inui, Yamatokoriyama; Yoshihiro Sekimoto, Soraku-gun; Hideaki Sato, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/129,191

(22) Filed: Jul. 23, 1998

(30) Foreign Application Priority Data

Aug. 4, 1997 (JP) .............................. 9-208804
Aug. 22, 1997 (JP) .............................. 9-225906

(51) Int. Cl.[7] ................................. G11B 5/09
(52) U.S. Cl. ............... 369/47.5; 369/53.27; 369/116
(58) Field of Search ...................... 369/44.27, 44.29, 369/44.32, 44.35, 54, 116, 47.5, 47.51, 47.52, 47.53, 47.55, 53.26, 53.27, 53.37, 53.38, 53.45, 124.15, 275.3

(56) References Cited

U.S. PATENT DOCUMENTS 5,367,509 A    11/1994   Fukumoto et al.
5,410,527 A    4/1995    Ashinuma
5,617,400 A    4/1997    Fuji
5,699,342 A    12/1997   Yagi et al.
5,796,704 A    8/1998    Nanba et al.

FOREIGN PATENT DOCUMENTS

EP    0 653 749 A2    5/1995
JP    07225952        8/1995
JP    08221760        8/1996
JP    8-329543        12/1996
KR    93-23950        12/1993

*Primary Examiner*—Paul W. Huber
(74) *Attorney, Agent, or Firm*—Edwards & Angell, LLP

(57) ABSTRACT

A reproducing light quantity control method for an optical memory device includes the steps of (1) recording test data on an optical recording medium; (2) reproducing the test data recorded on the optical recording medium by changing a reproducing light quantity in a plurality of light quantity values; (3) measuring a quality value and a signal quantity of each of a plurality of reproducing signals from the test data; (4) selecting an optimum reproducing signal quantity from a plurality of reproducing signal quantities in accordance with quality values of the plurality of reproducing signals so as to decide a target value of reproducing signal quantity; and (5) recording the target value on a target value recording region of the optical recording medium. This method reduces the time required to obtain a target value of a reproducing signal quantity and speeds up an operation from installing of the optical recording medium to finishing of preparation for recording and reproducing.

12 Claims, 13 Drawing Sheets

FIG. 9

```
                                                          1'
                                         k
                                                    10
                     d            e
→ DEMODULATING ────→ ERROR      ────→ CPU      f        12
  SECTION             CALCULATING                  ─→ SUBTRACTING
                      SECTION                         SECTION
        6                  9 g1
  ┌→ LONG MARK LEVEL ──────┐
     DETECTING SECTION      │
        5a                  ├→ DIVIDING
                            │  SECTION       r
  ┌→ SHORT MARK LEVEL ──────┘     11
     DETECTING SECTION
        5b      g2                                      h
              t2
  ┌→ TIMING              t1
     GENERATING                                    13
     SECTION                                    ─→ SWITCHING
        4                                          SECTION
                          8
                    ┌─────────────────┐
                    │ REPRODUCING LIGHT│←──────────────┘
                    │ QUANTITY LIMITING│
                    │ SECTION          │
                    └─────────────────┘
                        j1 │         │ n
                           ↓         →
                     DRIVING SECTION   14
            3a          │ j2
                        ↓
    PHOTODIODE     SEMICONDUCTOR  2
                  LASER                           w
       REFLECTED    a    PROJECTION
       LIGHT             LIGHT
         b                                    3b
                                            PHOTODIODE
                              1
```

REPRODUCING LIGHT QUANTITY CONTROL METHOD FOR OPTICAL MEMORY DEVICE, AND REPRODUCING LIGHT QUANTITY CONTROL DEVICE, AND OPTICAL RECORDING MEDIUM

FIELD OF THE INVENTION

The present invention relates to a reproducing light quantity control method adopted in an optical memory device, in which a light beam is projected on an optical recording medium having a reproducing layer and a recording layer, and a magnetic aperture smaller than a spot diameter of the light beam is generated in the reproducing layer so as to reproduce record marks recorded on the recording layer, for controlling a reproducing light quantity of the light beam projected on the optical recording medium optimum, and a reproducing light quantity control device, and an optical recording medium.

BACKGROUND OF THE INVENTION

Conventionally, a technology for improving recording density of an optical recording medium by a so-called super resolution effect has been developed. In this method, a light beam is projected on an optical recording medium having a reproducing layer and a recording layer on a substrate, and a magnetic aperture having a smaller diameter than the light spot diameter is generated on the reproducing layer. As an example of such a method, a so-called magnetic super resolution is known.

The magnetic super resolution is a phenomenon in which a high temperature portion of the reproducing layer by the projection of light beam forms, by the magnetic coupling with the recording layer, a magnetic aperture for reading recorded information. In this phenomenon, the temperature distribution of the portion projected by the light beam takes the form of Gaussian distribution. Also, the temperature distribution is influenced by the heat capacity of the recording medium and the environment temperature. For this reason, it is always required to control the aperture size optimum by controlling the reproducing light quantity. Japanese Unexamined Patent Publication No. 63817/1996 (Tokukaihei 8-63817) discloses a device which carries out this control. The following briefly describes the operation of such a device.

FIG. 16(a) shows a mark string recorded on the optical recording medium and the waveform of reproducing signal obtained when the mark string is reproduced. In FIG. 16(a), when a light beam with a certain reproducing light quantity is projected on the optical recording medium, by the Gaussian temperature of the light beam, the temperature of the center of the light beam projected portion becomes high. In this high temperature portion of the reproducing layer, a magnetic aperture "ap" is generated. When the reproducing light quantity is small, the aperture "ap" takes the form of an aperture "$ap_1$" having a smaller diameter, indicated by a solid line, and when the reproducing light quantity is large, takes the form of an aperture "$ap_2$" having a larger diameter, indicated by a broken line.

Of the marks recorded on the recording layer, for example, from a long mark 101 larger than the aperture "$ap_1$" having a smaller diameter, a signal quantity (for example, peak-to-peak amplitude) $v_1$ of a reproducing signal cl is detected, and from a short mark 102 smaller than the aperture "$ap_2$", a signal quantity (for example, peak-to-peak amplitude) $v_2$ of a reproducing signal cs is detected. In this manner, the resolving power when reading the record marks varies depending on the size of the aperture "ap".

The resolving power can be substituted by a ratio $v_2/v_1$ which is a ratio of the reproducing signal quantity $v_1$ of the long mark 101 to the reproducing signal quantity $v_2$ of the short mark 102, and the size of the aperture "ap" can be detected from the value of the ratio.

In a graph of FIG. 16(b), the horizontal axis represents the size Pr of reproducing light quantity, and the vertical axis represents an amplitude ratio of long mark and short mark and an error rate. With respect to reproducing light quantity Pr, the error rate of the reproducing data and the reproducing signal quantity ratio $v_2/v_1$ vary in the manner as shown in FIG. 16(b). When the error rate of the reproducing data is minimum, the reproducing signal quantity ratio $v_2/v_1$ becomes an optimum amplitude ratio, and the reproducing light quantity becomes an optimum reproducing light quantity $Pr_0$.

Thus, in the conventional device, the reproducing light quantity Pr is controlled after deciding the optimum amplitude ratio so that the reproducing signal quantity ratio $v_2/v_1$ obtained from the reproducing signal approaches the optimum amplitude ratio. Also, in the conventional device, on the optical recording medium, the long mark 101 and the short mark 102 are pre-recorded, and there are provided (i) a long mark recording region in which long marks 101 are recorded repeatedly and (ii) a short mark recording region in which short marks 102 are recorded repeatedly. The reproducing signal quantity ratio $v_2/v_1$ is detected by reproducing respective control patterns of the long mark 101 and the short mark 102 respectively recorded on the long mark recording region and the short mark recording region, and the reproducing light quantity Pr is controlled so that the reproducing light quantity Pr becomes an optimum reproducing light quantity $Pr_0$.

However, generally, because the heat capacity of each optical recording medium is different, in a reproducing light quantity control device, it is required to measure the error rate of reproducing data and the amplitude ratio (reproducing signal quantity ratio $v_2/v_1$) of reproducing signal, and determine an optimum amplitude ratio, and set the optimum reproducing light quantity $Pr_0$ everytime a different optical recording medium is installed.

Here, generally, when a bit rate error is $10^{-5}$, by an error correction technique, a bit error of $10^{-12}$ is obtained, which is demanded in a computer memory device. When the bit error rate is on $10^{-5}$, in order to measure the bit error rate with an error of 1 percent, it is required to detect at least 100 error bits, and carry out measurement so that the number of sample bits is $10^7$. Generally, since the transfer rate of an optical disk is 10 Mbps at the maximum, it takes 1 second at the fastest to measure the number of sample bits. Since one measurement takes 1 second, for example, when the change in error rate is to be measured while changing the reproducing light quantity in 10 levels, it takes 10 seconds to determine the optimum value (optimum amplitude ratio). Namely, it is required to wait at least 10 seconds from installing of the optical recording medium to recording and reproducing of information. As a result, a problem is presented that a high-speed device cannot be realized.

Further, the conventional device also has a problem that control malfunction results when the optical disk (optical recording medium) has a defect or scratch.

For example, when an irregular reproducing signal is generated by a defect or scratch on the optical disk, and as shown by $x_1$ of FIG. 16(c), when the amplitude $v_2$ of the reproducing signal from the short mark 102 becomes large, or as shown by $x_4$, when the amplitude $v_1$ of the reproducing signal from the long mark 101 becomes small, the reproducing signal quantity ratio $v_2/v_1$, namely, the amplitude ratio $v_2/v_1$ of the reproducing signal becomes excessively large. When the reproducing light quantity control device mistakenly responds to this amplitude ratio, the reproducing light quantity is increased, and the temperature of the recording layer exceeds the curie point. As a result, a problem is presented that the following record marks are destroyed by the defect or scratch. In the worst case, a serious problem is caused that the periodically recorded reproducing light quantity control patterns of the following record marks are destroyed and the reproducing light quantity cannot be controlled.

Also, as shown in $x_2$ of FIG. 16(*c*), when the amplitude $v_2$ of the reproducing signal from the short mark 102 becomes small, or as shown in $x_3$, when the amplitude $v_1$ of the reproducing signal from the long mark 101 becomes large, the amplitude ratio $v_2/v_1$ becomes excessively small. When the reproducing light quantity control device mistakenly responds to this condition, the reproducing light quantity is reduced, and the temperature of the reproducing layer becomes not more than the curie point. As a result, a problem is presented that the aperture of the reproducing layer disappears and the data cannot be reproduced. In the worst case, the reproducing light quantity control pattern cannot be reproduced, and the reproducing light quantity control is disabled.

Namely, when the signal quantity (amplitude) of the reproducing signal is detected, and the reproducing light quantity is controlled in accordance with this detection, the reproducing light quantity control malfunctions due to the defect or scratch. As a result, the record marks following the defect portion or scratched portion are destroyed, and possibly reproducing cannot be carried out.

SUMMARY OF THE INVENTION

It is an object of the present invention to provide a reproducing light quantity control method for an optical memory device, for reducing time required to decide an optimum amplitude ratio so as to speed up an operation from installing of the optical memory device to finishing of preparation for recording and reproducing.

In order to realize the above-mentioned object, a reproducing light quantity control method for an optical memory device of the present invention includes the steps of:

(1) recording test data on an optical recording medium;

(2) reproducing the test data recorded on the optical recording medium by changing a reproducing light quantity in a plurality of light quantity values, the reproducing light quantity being a light quantity of when reproducing;

(3) measuring a quality value and a signal quantity of each of a plurality of reproducing signals from the test data at the plurality of light quantity values;

(4) selecting an optimum reproducing signal quantity from a plurality of reproducing signal quantities in accordance with quality values of the plurality of reproducing signals so as to decide a target value of reproducing signal quantity; and (5) recording the target value on a target value recording region of the optical recording medium.

With this method, once the target value is recorded on the optical recording medium, in the following, when the optical recording medium is installed in the optical memory device, the measuring operation of the error rate can be omitted.

Also, after reading the target value recorded in the target value recording region, it is possible to start the control of reproducing light quantity instantly in accordance with the target value thus read, thereby suppressing the error in the reproducing data.

Namely, the transition to the recording-reproducing operation of information data can be made rapidly.

Also, with the above method, when the target value is decided beforehand at the time of shipping the optical recording medium from the factory, and the target value is recorded in the target value recording region, when the optical recording medium shipped is installed in the optical memory device of the user, the transition to the information recording-reproducing operation can be made instantly.

It is another object of the present invention to provide a highly reliable reproducing light quantity control device for an optical memory device capable of preventing recording marks of the recording layer from being destroyed and preventing the aperture generated in the reproducing layer from disappearing even when a reproducing signal quantity from the reproducing light quantity control pattern is mistakenly detected.

In order to achieve the above-mentioned object, a reproducing light quantity control device for an optical memory device of the present invention which projects a light beam on an optical recording medium including a reproducing layer and a recording layer and generates an aperture having a diameter smaller than a light spot diameter in the reproducing layer so as to reproduce information recorded on the recording layer, is characterized by including:

signal quantity detecting section for detecting reproducing signal quantities from marks recorded on the optical recording medium;

control section for controlling a reproducing light quantity of the light beam so that the reproducing signal quantities detected by the signal quantity detecting section approach a predetermined value; and reproducing light quantity limiting section for limiting the reproducing light quantity not more than an upper limit value so as to prevent a temperature of the recording layer from reaching a temperature which erases the marks.

With this arrangement, the reproducing light quantity projected on the optical recording medium is limited to be not more than a predetermined upper limit value so that the temperature of the recording layer does not reach a temperature which erases the recording marks. Thus, even when the reproducing signal quantity is mistakenly detected due to a defect or scratch on the disk, the recording marks of the recording layer of the optical recording medium are prevented from being destroyed.

Another reproducing light quantity control device for an optical memory device of the present invention which projects a light beam on an optical recording medium including a reproducing layer and a recording layer and generates an aperture having a diameter smaller than a light spot diameter in the reproducing layer so as to reproduce information recorded on the recording layer, is characterized by including:

signal quantity detecting section for detecting reproducing signal quantities from marks recorded on the optical recording medium;

control section for controlling a reproducing light quantity of the light beam so that the reproducing signal quantities detected by the signal quantity detecting section approach a predetermined value; and reproducing light quantity limiting section for limiting the reproducing light quantity not less than a lower limit value so that a temperature of the reproducing layer reaches a temperature which generates the aperture.

With this arrangement, the reproducing light quantity projected on the optical recording medium is controlled to be not less than the lower limit value so that the temperature of the recording layer reaches a temperature which generates the aperture. Thus, even when the reproducing signal quantity is mistakenly detected due to a defect or scratch on the disk, the aperture from the control pattern is prevented from disappearing, thus realizing a stable reproducing light quantity control in accordance with the reproducing signal quantity.

For a fuller understanding of the nature and advantages of the invention, reference should be made to the ensuing detailed description taken in conjunction with the accompanying drawings.

BRIEF DESCRIPTION OF THE DRAWINGS

FIG. 9 is a block diagram showing a reproducing light quantity control device of an optical memory device in accordance with another embodiment of the present invention.

DESCRIPTION OF THE EMBODIMENTS

[First Embodiment]

The following will describe one embodiment of the present invention referring to FIG. 1 through FIG. 8

Figure 1:
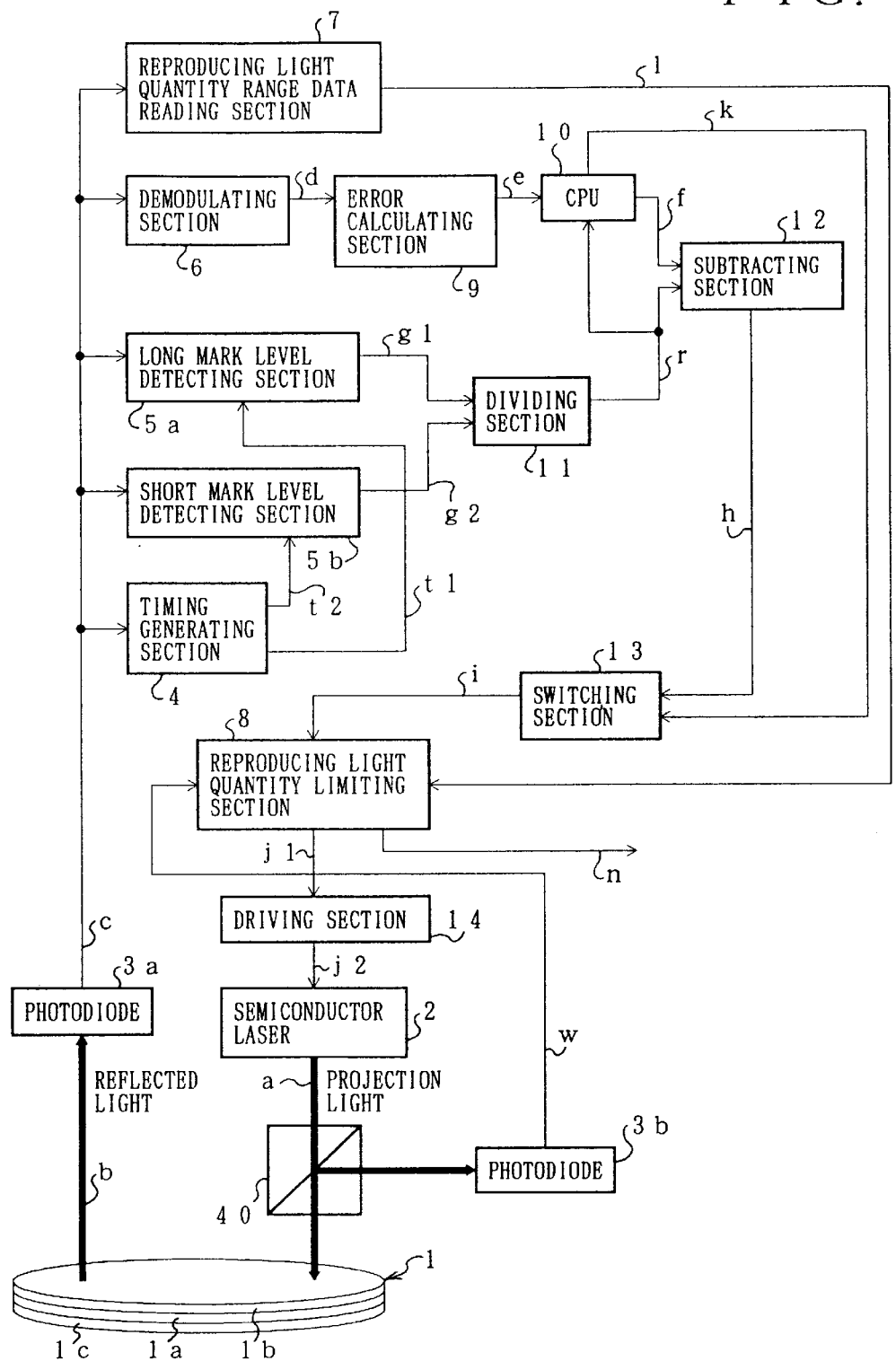
FIG. 1 is a block diagram showing a reproducing light quantity control device of an optical memory device in accordance with one embodiment of the present invention.

FIG. 1 is a drawing explaining a reproducing light quantity control device of one embodiment of the present invention. As shown in FIG. 1, projection light "a" from a semiconductor laser 2 is projected onto a magneto-optical disk 1 (optical recording medium) via a beam splitter 40, and at the same time, is incident on a photodiode 3b by being bent in a right angle direction. The photodiode 3b converts the incident light into an electric signal, namely, a light quantity detection signal "w". The light quantity detection signal "w" is guided to a reproducing light quantity limiting section 8 (reproducing light quantity limiting means). The reproducing light quantity limiting section 8 limits a reproducing light quantity in a predetermined range while detecting a light quantity of a reproducing light, which is the projection light "a" from the semiconductor laser 2, in accordance with the light quantity detection signal "w".

The magneto-optical disk 1 is provided with a recording layer 1a in which perpendicular magnetization recording is carried out and a reproducing layer 1b. The reproducing layer 1b has in-plane magnetization from room temperature to a curie temperature, and has perpendicular magnetization at a temperature of not less than the curie temperature.

When the projection light "a" (light beam) is projected on the magneto-optical disk 1, the following phenomenon is observed. Perpendicular magnetization appears in a temperature-increased portion of the reproducing layer 1b, corresponding to the center of the Gaussian distribution of the projection light "a", and by the magnetic coupling of this perpendicular magnetization and the perpendicular magnetization of a recording mark magnetically recorded on the recording layer 1a, the recording mark is transferred to the reproducing layer 1b. Namely, a magnetic aperture for reading is formed on the reproducing layer 1b. On the other hand, in a portion of the reproducing layer 1b on which the light beam is not projected, in-plane magnetization is maintained, and a magnetic mask is formed. This is a so-called magnetic superresolution of CAD (Center Aperture Detection) system. Other than this system, a so-called RAD (Rear Aperture Detection) system is widely known, in which the temperature-increased portion masks the recording mark of the recording layer 1a, and a portion other than the temperature-increased portion under the light spot forms a magnetic aperture.

Meanwhile, reflected light "b" or transmitted light from the magneto-optical disk 1 is inputted into a photodiode 3a, and is converted to a read signal "c". The read signal "c" is sent to a reproducing light quantity range data reading section 7 (reproducing light quantity range data reading means), a demodulating section 6, a long mark level detecting section 5a (signal quantity detecting means), a short mark level detecting section 5b (signal quantity detecting means), and a timing generating section 4.

The reproducing light quantity range data reading section 7 reads out reproducing light quantity range data "l" from a reproducing light quantity range data recording region 15a (see FIG. 4) provided in a read-in region of the magneto-optical disk 1, and outputs thereof to the reproducing light quantity limiting section 8. The reproducing light quantity range data "l" are already stored in the magneto-optical disk 1 when shipping of the magneto-optical disk 1 is made. The reproducing light quantity range data "l" are used, as will be described later, for controlling of limiting the light quantity of the projection light "a" so that the light quantity of the projection light "a" does not become excessive or insufficient. Namely, the reproducing light quantity limiting section 8 outputs, in accordance with the reproducing light quantity range data "l", a light quantity control signal $j_1$ for controlling the upper limit and the lower limit of the reproducing light quantity to a driving section 14. The driving section 14 sends a driving current $j_2$ in accordance with the light quantity control signal $j_1$ to the semiconductor laser 2. Hence, the semiconductor laser 2 projects projection light "a" with a light quantity whose upper limit value and the lower limit value are limited. Details of the reproducing light quantity limiting section 8 will be described later referring to FIG. 2.

The demodulating section 6 demodulates the read signal "c" and outputs reproducing information "d". The reproducing information "d" is inputted into an error calculating section 9 (reproducing signal measuring means). The error calculating section 9 calculates an error number "e", and the result of calculation is sent to a CPU 10 (control means).

The CPU 10 outputs a light quantity setting signal "k" to the reproducing light quantity limiting section 8 via a switching section 13, and while changing the light quantity of the reproducing light (projection light "a"), measures the error number "e" and an amplitude ratio "r" obtained from a dividing section 11 (signal quantity detecting means). The CPU 10 then stores the amplitude ratio "r" of when the error number "e" is minimum, and outputs a target amplitude ratio "f" (target value) to be a control target value of the reproducing light quantity to a subtracting section 12.

Figure 16A:
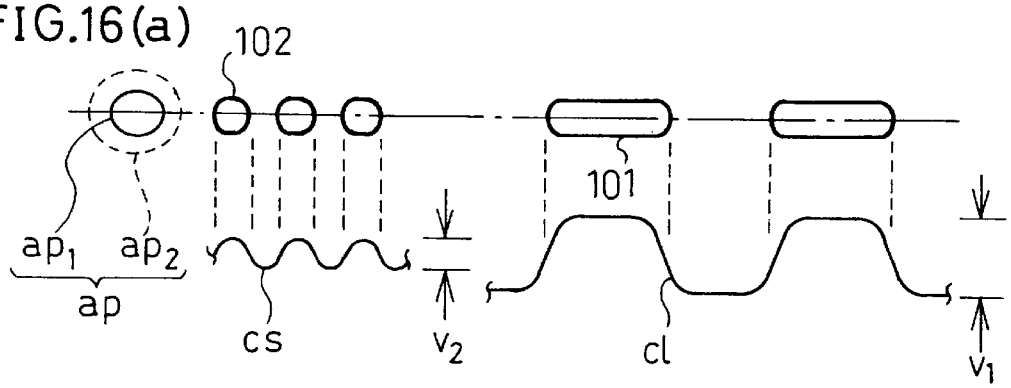
FIG. 16(a) is an explanatory drawing showing a plurality of record marks recorded on an magneto-optical disk, reproducing signals therefrom, and apertures.
Figure 16B:
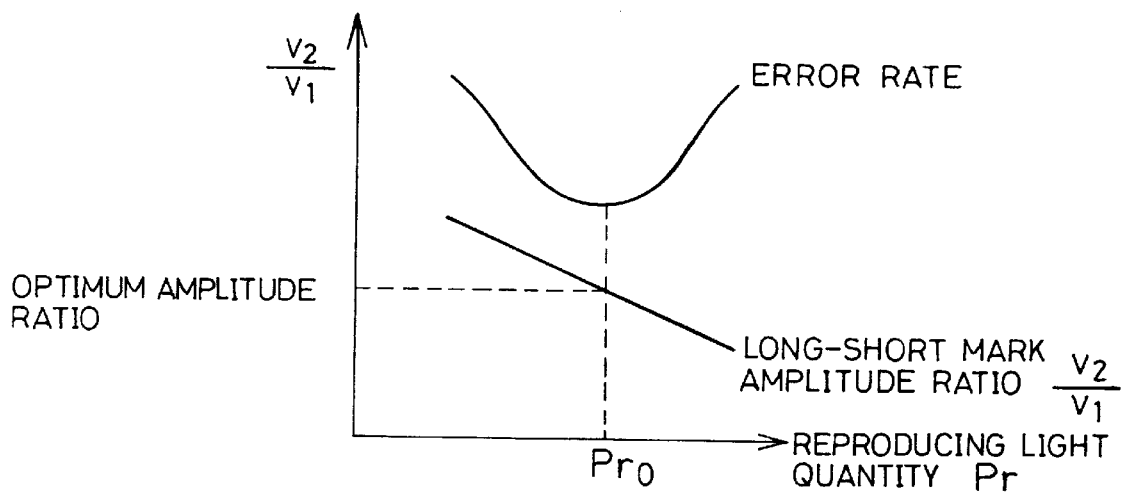
FIG. 16(b) is a graph showing a relationship between (1) amplitude ratio of reproducing signals from a long mark and a short mark and (2) reproducing light quantity.
Figure 16C:
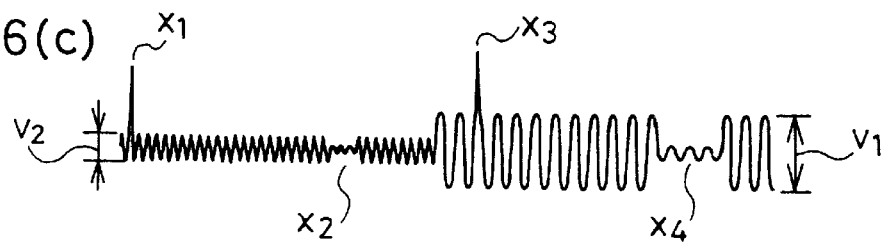
FIG. 16(c) is a waveform diagram showing an irregular output of the reproducing signals of FIG. 16(a).

The long mark level detecting section 5a is provided with, for example, an envelope wave detector and an A/D converter. The long mark level detecting section 5a detects a signal quantity (for example, amplitude value) of the long mark 101 of FIG. 16, and the detected value is subjected to A/D conversion in accordance with a long mark detection timing signal $t_1$ from the timing generating section 4, and the detected value is outputted as a long mark amplitude value $g_1$ to the dividing section 11.

Similarly, the short mark level detecting section 5b detects a signal quantity (for example, amplitude value) of the short mark 102, and the detected value is subjected to A/D conversion in accordance with a short mark detection timing signal $t_2$ from the timing generating section 4, and the detected value is outputted as a short mark amplitude value $g_2$ to the dividing section 11. The dividing section 11 determines an amplitude ratio "r" from the amplitude values $g_1$ and $g_2$, and supplies the amplitude ratio "r" thus determined to the subtracting section 12 and the CPU 10.

Note that, as described, during the operation of determining the target amplitude ratio "f", the CPU 10 outputs the light quantity setting signal "k", and while changing the reproducing light quantity of the projection light "a", measures the error number "e" and the amplitude ratio "r". Meanwhile, during the operation of controlling the reproducing light quantity, the subtracting section 12 compares the target amplitude ratio "f" and the amplitude ratio "r", and outputs a light quantity control signal "h" in which the difference between the target amplitude ratio "f" and the amplitude ratio "r" is close to zero. Also, the switching section 13 selects the light quantity setting signal "k" when the target amplitude ratio "f" is determined by the CPU 10, and selects the light quantity control signal "h" when the reproducing light quantity is controlled. The switching section 13 outputs the signal selected as a light quantity control signal "i" to the reproducing light quantity limiting section 8.

The light quantity control signal "i" is limited in a range between the upper limit and the lower limit in the reproducing light quantity limiting section 8, and is sent as a control signal $j_1$ to the driving section 14. The driving section 14 supplies the driving current $j_2$ in accordance with the control signal $j_1$ to the semiconductor laser 2.

Also, the reproducing light quantity limiting section 8 detects whether the reproducing light quantity exceeds a predetermined reproducing light quantity range in accordance with the light quantity detection signal "w" from the photodiode 3b, and outputs to outside an inspection signal "n" indicating the result of detection. The inspection signal "n" informs outside malfunctioning of the reproducing light quantity control in the present reproducing light quantity control device.

Figure 2:
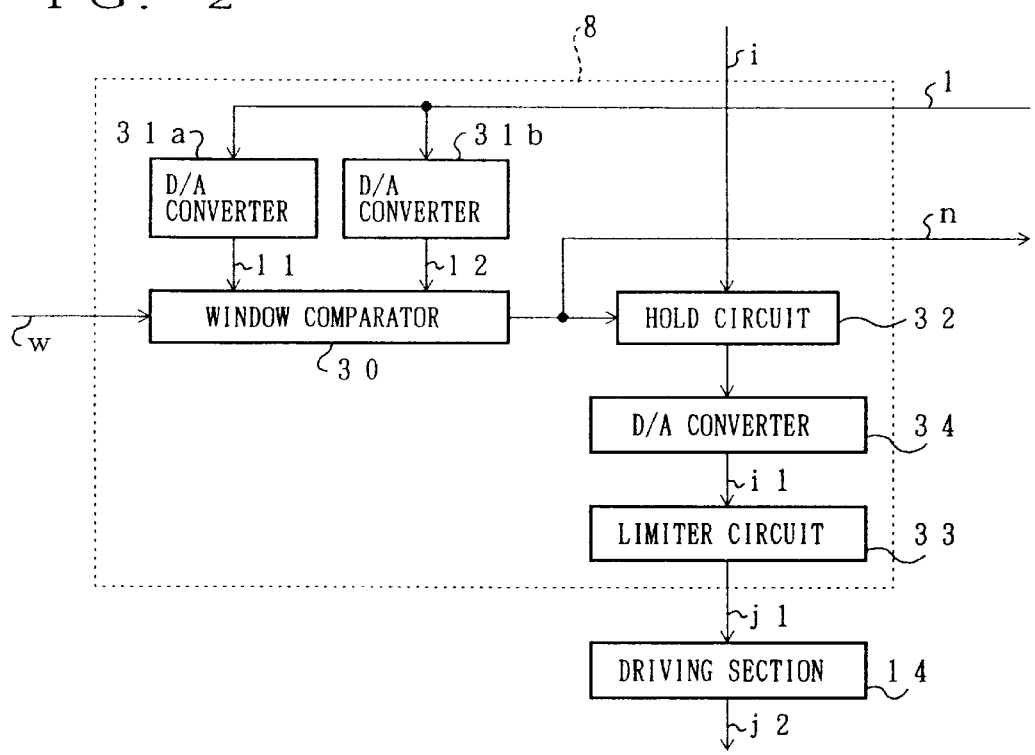
FIG. 2 is a block diagram showing in detail a structure of a reproducing light quantity limiting section shown in FIG. 1.

FIG. 2 is a drawing explaining in detail the reproducing light quantity limiting section 8 and the driving section 14 of FIG. 1. The light quantity control signal "i" is inputted into a hold circuit 32 of the reproducing light quantity limiting section 8. As will be described later, when the light quantity of the reflected light "b" off the magneto-optical disk 1 exceeds a predetermined range, the hold circuit 32 holds an immediately preceding light quantity control signal "i", and limits the quantity of light emitted from the semiconductor laser 2.

The reproducing light quantity range data "l" are sent to D/A converters 31a and 31b, and the D/A converter 31a and the D/A converter 31b respectively output an upper limit value $l_1$ and a lower limit value $l_2$ of the reproducing light quantity range data "l" to a window comparator 30. In the window comparator 30, when the light quantity detection signal "w" received from the photodiode 3b exceeds the upper limit value $l_1$ or is lower than the lower limit value $l_2$, the inspection signal "n" becomes high level, and when the light quantity detection signal "w" falls in a range of the upper limit value $l_1$ and the lower limit value $l_2$, the inspection signal becomes low level.

The hold circuit 32 sends, when the inspection signal is a low level, the light quantity control signal "i" directly to a D/A converter 34, and when the inspection signal "n" is a high level, the hold circuit 32 holds an immediately preceding light quantity control signal "i" and sends the light quantity control signal "i" to the D/A converter 34. As a result, the light emitted from the semiconductor laser 2 is limited in a limiting range between the upper limit value $l_1$ and the lower limit value $1_2$.

A light quantity control signal $i_1$ outputted from the D/A converter 34 is sent to a limiter circuit 33, and the light quantity control signal $i_1$ is limited in a range between an upper limit value $l_1$', which is higher than the upper limit value $l_1$, and a lower limit value $l_2$', which is lower than the lower limit value $l_2$. Thus, even when the hold circuit 32 mistakenly holds data outside the limiting range, an excessive current or insufficient current is prevented from continuously flowing into the semiconductor laser 2. The output of the limiter circuit 33, namely, a control signal $j_1$ is sent to the driving section 14, and the driving section 14 sends the driving current $j_2$ in accordance with the control signal $j_1$ to the semiconductor laser 2.

Figure 3:
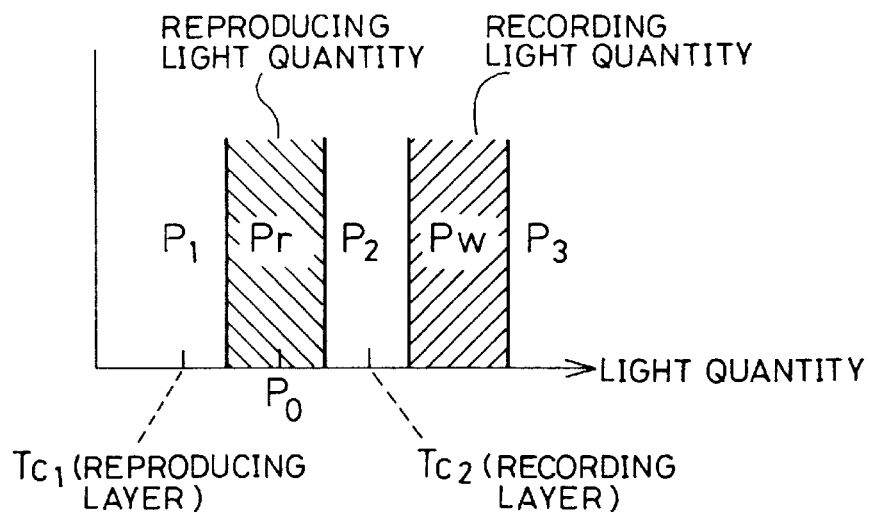
FIG. 3 is an explanatory drawing showing a range of reproducing light quantity and recording light quantity of the reproducing light quantity control device.

FIG. 3 is a drawing explaining the limiting range of the reproducing light quantity emitted from the semiconductor laser 2. An appropriate range Pr of the reproducing light quantity falls in a range between a light quantity which increases the temperature of the reproducing layer 1b to a curie temperature $Tc_1$ and a light quantity which increases the temperature of the recording layer 1a to a curie temperature $Tc_2$. In the range Pr, the aperture "ap" is generated on the reproducing layer 1b, and the recording marks (long and short marks 101 and 102) of the recording layer 1a are not destroyed.

In a range $P_1$ in which the light quantity is slightly less than that of the range Pr, because the increased temperature of the reproducing layer 1b is in a vicinity of the curie temperature $Tc_1$, the generation of the aperture "ap" becomes unstable. This problem is presented when there is a detection error between the light quantity actually projected on the magneto-optical disk 1, for example, as shown in FIG. 1, and the light quantity detected by the photodiode 3b. Also, in a range in which the temperature of the reproducing layer 1b is lower than the curie temperature $Tc_1$, the aperture "ap" is not generated. Namely, with the reproducing light quantity of the range $P_1$, the aperture "ap" required for reproducing cannot be generated.

Also, in a range $P_2$ in which the light quantity is slightly more than that of the range Pr having an appropriate light quantity, because the increased temperature of the recording layer 1a is in a vicinity of the curie temperature $Tc_2$, there is a case that the recording marks of the recording layer 1a are destroyed. Further, when the increased temperature of the recording layer 1a becomes higher than the curie temperature $Tc_2$, the recording marks are completely destroyed. Namely, with the light quantity of the range $P_2$, there is a possibility that recording is destroyed.

Note that, during information recording, the light quantity falls in a range Pw of recording light quantity having a large light quantity, and a temperature sufficient for the magnetic inversion of the recording layer 1a is obtained, and the recording marks are stably formed. Also, in a range $P_3$ in which the light quantity is even larger, the temperature of the recording layer 1a becomes excessively high, and the recording layer 1a and the reproducing layer 1b are deteriorated.

As described, when the reproducing light quantity is limited in the range Pr, even when the reproducing light quantity control device responds by mistake due to a defect or scratch on the magneto-optical disk 1, it is possible to prevent the reproducing light quantity from increasing and recorded information (recording marks) and a reproducing light quantity control pattern from being destroyed. Also, it is possible to prevent lowering of reproducing light quantity and disappearance of the aperture "ap". Namely, in a reproducing light quantity control in accordance with a reproducing signal, destruction of recording marks and disappearance of aperture "ap" are prevented.

Figure 4:
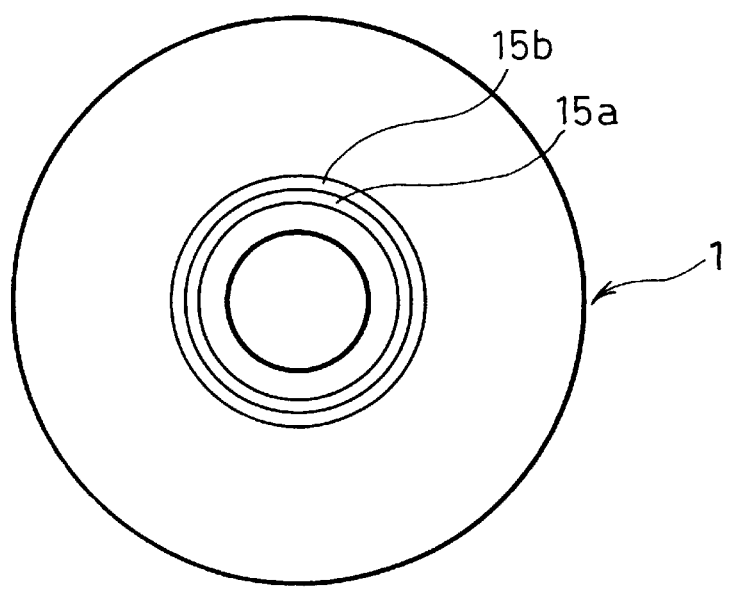
FIG. 4 is an explanatory drawing showing each region of an magneto-optical disk shown in FIG. 1.

FIG. 4 is a drawing explaining the magneto-optical disk 1. The magneto-optical disk 1 has an arrangement wherein double layers of at least the recording layer 1a and the reproducing layer 1b are formed on a transparent substrate 1c made of glass or a plastic material (see FIG. 1). The recording layer 1a is made of a perpendicular magnetization film material, and magnetic recording is carried out thereon as the direction of perpendicular magnetization is changed in accordance with recording information. The reproducing layer 1b has in-plane magnetization from room temperature to a curie temperature, and a transition to perpendicular magnetization occurs at a temperature of not less than the curie temperature.

On a reproducing light quantity range data recording region 15a provided in a read-in region on the inner periphery of the magneto-optical disk 1, the reproducing light quantity range data "l" are recorded in the form of raised areas and land in an unerasable manner. The reproducing light quantity range takes a different value for each type of the magneto-optical disk 1, and therefore is already recorded when shipping is made from the factory. As the reproducing light quantity range data "l", as will be described later, the lower limit value and the upper limit value of the reproducing light quantity are recorded, at which the error rate of the reproducing data is not less than a predetermined value.

The reproducing light quantity control device of FIG. 1 reads the reproducing light quantity range data "l", and limits the reproducing light quantity outputted from the semiconductor laser 2 in accordance with the reproducing light quantity range data "l". Because the temperature which destroys the recording marks of the recording layer 1a and the temperature at which the aperture "ap" disappears are different for each type of the magneto-optical disk 1, the range of reproducing light quantity for reaching a temperature range between these two temperatures is pre-recorded as the reproducing light quantity range data "l".

Note that, the reproducing light quantity range data "l" are not limited to data setting a range of safe reproducing light quantity as described above. Instead, the reproducing light quantity range data "l" can be substituted by a temperature range of a magneto-optical film. In this case, a reproducing light quantity P is determined from $P=C \times T \times V^{0.5}$ where, as parameters, C is a heat capacity of a recording medium, V is a relative linear velocity of the light spot and the magneto-optical disk 1, and T is a temperature. Namely, the reproducing light quantity is proportional to $V^{0.5}$. From an experiment, when the temperature was room temperature (23° C.) and the relative linear velocity of the light spot and the magneto-optical disk 1 was 3.6 m/s, it was found that the range of the upper limit and the lower limit of the reproducing light quantity was from 1.8 mW to 3 mW. Hence, the range is determined as $0.9 \times V^{0.5}$ (mW) to $1.6 \times V^{0.5}$ (mW), and it is required to limit the reproducing light quantity in this range. For example, considering safely, the reproducing light quantity range is set to a slightly narrowed range of $1.0 \times V^{0.5}$ (mW) to $1.5 \times V^{0.5}$ (mW). This value is recorded as the reproducing light quantity range data "l" in the reproducing light quantity range data recording region 15a.

The magneto-optical disk 1 is also provided with a test region 15b. In the test region 15b, test data are pre-recorded. The reproducing light quantity control device measures, in order to obtain the target amplitude ratio "f", reproducing error of the test data by changing the reproducing light quantity in the test region 15b.

Figure 5:
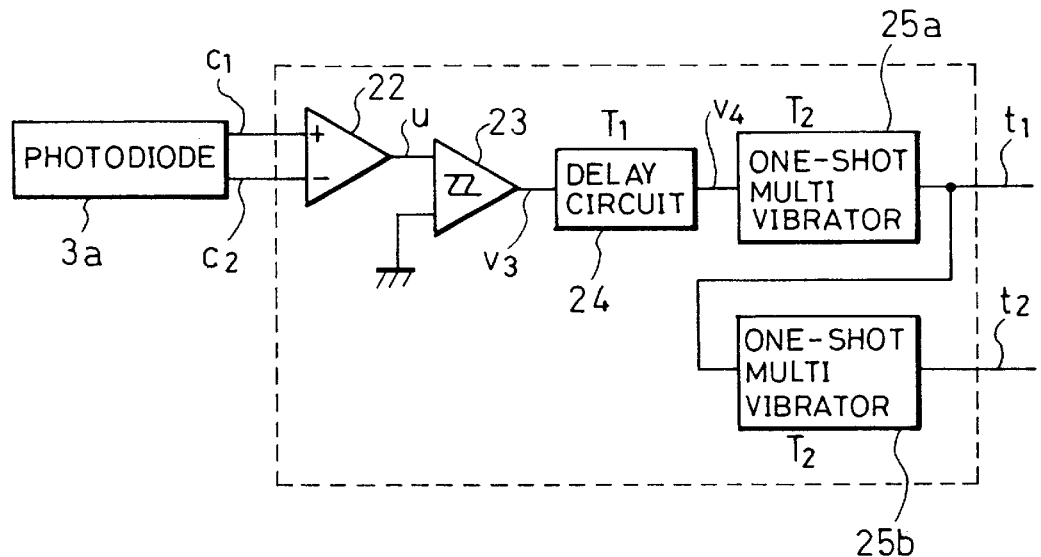
FIG. 5 is a block diagram showing in detail a structure of a timing generating section shown in FIG. 1.

FIG. 5 is a drawing explaining the timing generating section 4 of FIG. 1. The reflected light "b" off the magneto-optical disk 1 inputted into the photodiode 3a which is a separated photodetector. Two output signals $c_1$ and $c_2$ from the photodiode 3a are inputted into a differential amplifier 22 of the timing generating section 4, and a track error signal "u" of the well-known push-pull system is obtained. The track error signal "u" includes a read signal from a reference mark 21 (mentioned later).

A hysteresis comparator 23 compares the read signal with a ground level. A delay circuit 24 delays a reference mark detection signal $v_3$ as obtained from the comparison for period $T_1$. A one-shot multi vibrator 25a receives an output signal $v_4$ of the delay circuit 24, and outputs the long mark detection timing signal $t_1$ which becomes a high level for period $T_2$. A one-shot multi vibrator 25b receives the long mark detection timing signal $t_1$, and outputs a short mark detection timing signal $t_2$ which becomes a high level for period $T_2$.

Figure 6:
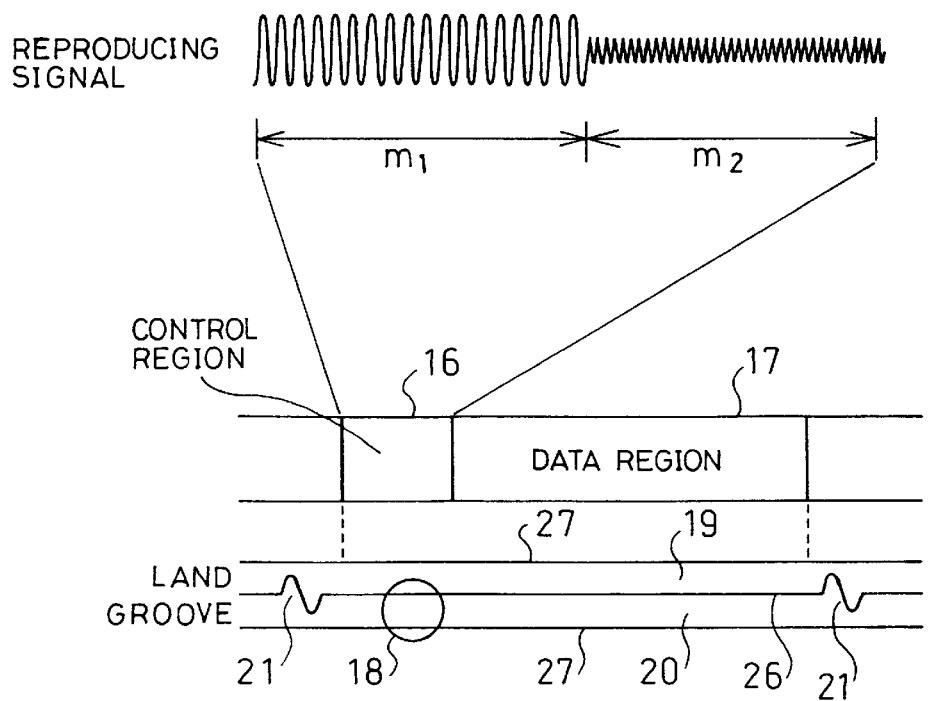
FIG. 6 is an explanatory drawing of a signal recording state of the magneto-optical disk if FIG. 1.
Figure 7:
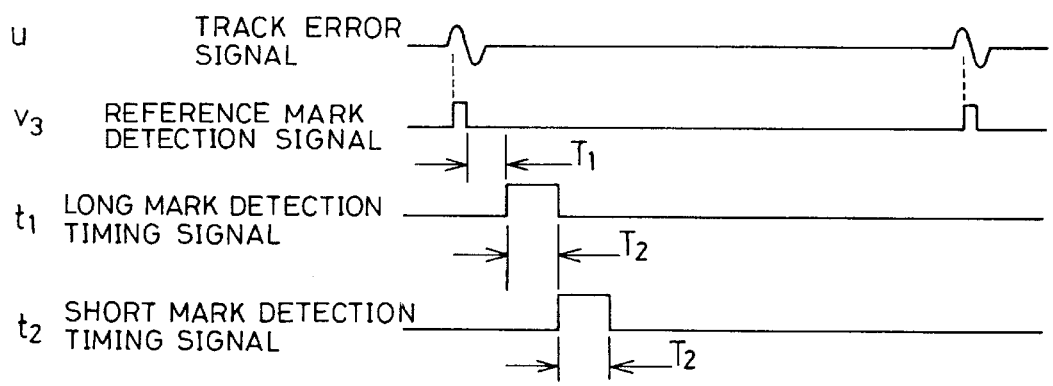
FIG. 7 is a drawing showing a waveform of each section of the timing generating section of FIG. 5.

FIG. 6 is an explanatory drawing of a signal recording state of the magnet-optical disk 1. FIG. 7 is a wave diagram explaining the operation of the timing generating section 4 of FIG. 5. As shown in FIG. 6, in the magneto-optical disk 1, recording information and reproducing light quantity control pattern are recorded on both tracks of a land 19 and a groove 20. This system is called a land/groove recording system. In a direction along the track of the magneto-optical disk 1, a control region 16 and a data region 17 are placed alternately. On the control region 16, a control pattern for controlling reproducing light quantity is recorded, and on the data region 17, information is recorded. Also, on the control region 16, first, a long mark 101 of a repeated recording pattern $m_1$ for increasing the S/N of envelope detection is recorded, and a repeated pattern $m_2$ of a short mark 102 is recorded following the recording pattern $m_1$.

Also, on the magneto-optical disk 1, the reference mark 21 is provided for indicating the physical reference position of the magneto-optical disk 1 by periodic wobbling of a side wall 26 between the land 19 and the groove 20. In an arrangement wherein only the side wall 26 between the land 19 and the groove 20 is wobbled, and side walls 27 on the other sides are not wobbled, it is possible to reduce the cross talk with an adjacent reference mark (not shown) in the right angle direction to the track. The control region 16 and the data region 17 are provided in synchronization with the reference mark 21.

For example, as shown in FIG. 6, when the reference mark 21 is tracked by a spot 18 of the light beam, as shown in FIG. 7, the tracking error signal "u" includes read signals from a certain reference signal 21 and the following reference signal 21. When this tracking error signal "u" is binarized, the reference mark detection signal $v_3$ is obtained. The long mark detection timing signal $t_1$ becomes high level after period $T_1$ from the falling timing of the reference mark detection signal $v_3$, and becomes low level after period $T_2$. The short mark detection timing signal $t_2$ becomes high level from the falling timing of the long mark detection timing signal $t_1$, and becomes low level after period $T_2$. The high level duration of the long mark detection timing signal $t_1$ is equal to the length of the region on which the long mark pattern $m_1$ is recorded, and the high level duration of the short mark detection timing signal $t_2$ is equal to the length of the region on which the short mark pattern $m_2$ is recorded. In accordance with the long mark detection timing signal $t_1$ and the short mark detection timing signal $t_2$, the long mark level detecting section 5a and the short mark level detecting section 5b of FIG. 1 detect the amplitude values of the long mark 101 and the short mark 102, respectively, that is, the long mark amplitude value $g_1$ and the short mark amplitude value $g_2$.

Figure 8:
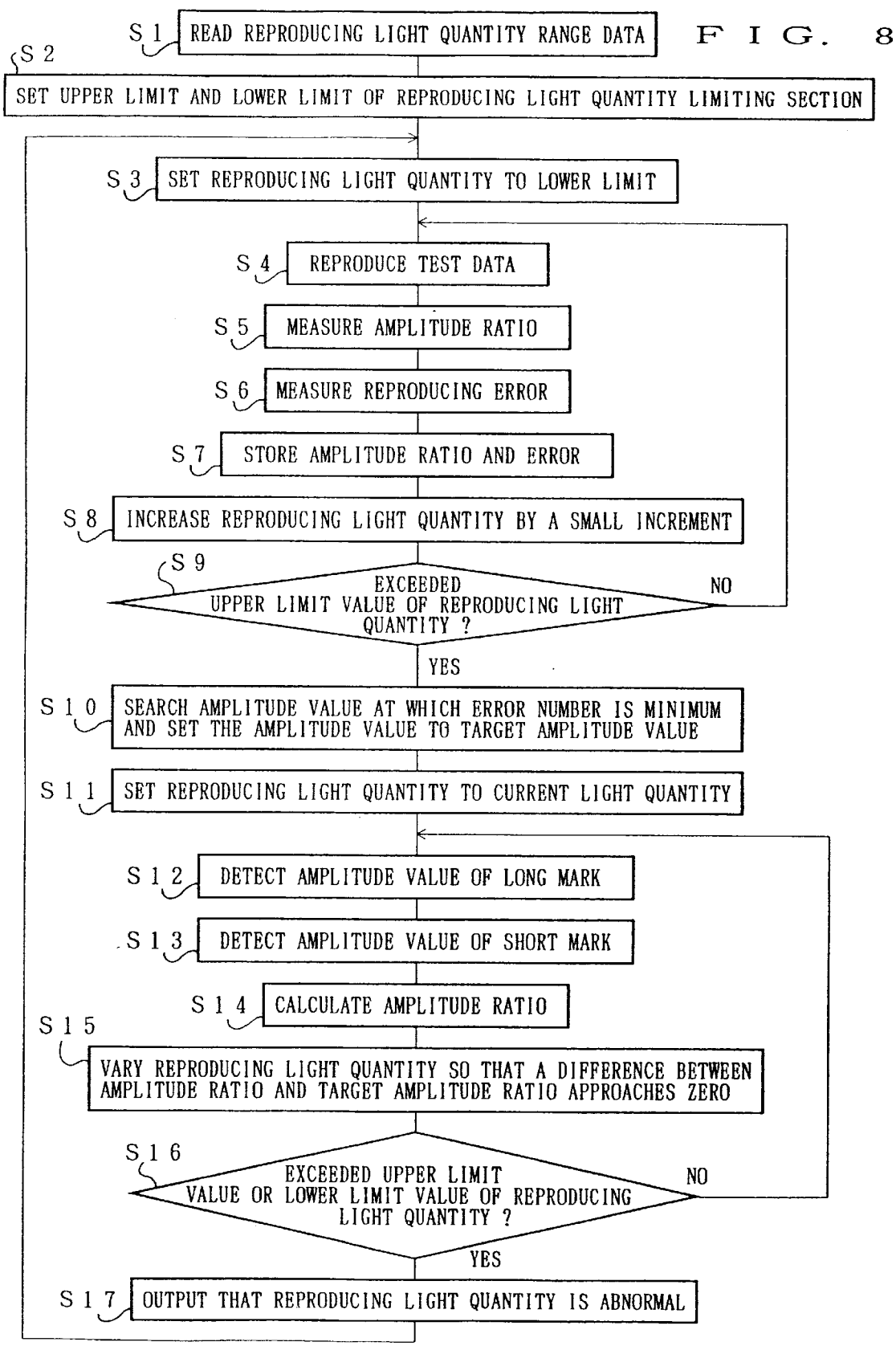
FIG. 8 is a flowchart showing an operation of the reproducing light quantity control device of FIG. 1.

FIG. 8 is a flowchart explaining the operation of the reproducing light quantity control device of FIG. 1.

In FIG. 8, S1 to S2 are steps for controlling the range of reproducing light quantity, S3 to S10 are steps for determining the target amplitude ratio "f", and S11 to S17 are steps for controlling the reproducing light quantity.

First, in S1, the reproducing light quantity range data "l" recorded on the reproducing light quantity range data recording region 15a of the read-in of the magneto-optical disk 1 are read out. This is carried out by the reproducing light quantity range data reading section 7. The reproducing light quantity range data "l" are recorded in the form of raised areas and land of the magneto-optical disk 1. Therefore, the reading operation in S1 is not magnetic reading from the aperture "ap" as described above, but is reading by diffraction of light; thus, even when the reproducing light quantity is fluctuating, stable reading is carried out.

In S2, the upper limit value and the lower limit value of reproducing light quantity are set in accordance with the reproducing light quantity range data "l". This is carried out by the reproducing light quantity limiting section 8.

In S3, the reproducing light quantity is set to the lower limit value, and in S4, the control pattern and the test data are read out. In S5, the amplitude ratio "r" of the control pattern is measured. In S6, the error rate of the test data is measured. This measurement of error rate is carried out by the error calculating section 9. Note that, the control pattern and the test data are recorded only once, and this is used repetitively in the following operations. In S7, the current amplitude ratio "r" of the reproducing signal and the current error number "e" are recorded. This is carried out by the CPU 10.

Then, in S8, the reproducing light quantity is increased by a small increment, and in S9, it is judged whether the reproducing light quantity has exceeded the upper limit value. When it is judged that the reproducing light quantity has not exceeded the upper limit value, the sequence returns to S4, and when it is judged that the reproducing light quantity has exceeded the upper limit value, in S10, the minimum value is searched from the error number "e" previously stored, and the current amplitude ratio "r" becomes the target amplitude ratio "f". The operations of S8 to S10 are carried out by the CPU 10.

Then, in S11, the reproducing light quantity is set to a light quantity value of when the error number "e" is minimum. In S12, the long mark amplitude value $g_1$ of the long mark recording region $m_1$ is detected. This detection is carried out by the long mark level detecting section 5a. In S13, the short mark amplitude value $g_2$ of the short mark recording region $m_2$ is detected. This detection is carried out by the short mark level detecting section 5b.

Then, in S14, the amplitude ratio "r" of the long mark amplitude value $g_1$ to the short mark amplitude value $g_2$ is calculated. This is carried out by the dividing section 11. In S15, the reproducing light quantity is varied so that the difference between the amplitude ratio "r" thus calculated and the target amplitude ratio "f" approaches zero. This is carried out by the subtracting section 12.

Then, it is judged whether the reproducing light quantity has exceeded the upper limit value or become lower than the lower limit value. When it is judged that the reproducing light quantity has not exceeded the upper limit value or has not become lower than the lower limit value, the sequence returns to S12, and when it is judged that the reproducing light quantity has exceeded the upper limit value or become lower than the lower limit value, in S17, the inspection signal "n" indicating that the light quantity is abnormal is outputted to outside. This is carried out by the reproducing light quantity limiting section 8. In this case, since the reproducing light quantity is reset, the sequence returns to S3, and the target amplitude ratio "f" is determined again.

Note that, in the described embodiment, in order to determine the target amplitude ratio "f", the measurement of the error number "e" of the test data is carried out by increasing the reproducing light quantity by a small increment: however, not limiting to this, it is possible measure the jitter of the reproducing signal, and the amplitude ratio "r" when the measured value is minimum is set to the target amplitude ratio "f". In this case, because the error number is minimum when the jitter value is minimum, the reproducing light quantity is controlled accordingly so that the reproducing error is also minimum.

[Second Embodiment]

The following will describe another embodiment of the present embodiment referring to FIG. 9 to FIG. 12.

FIG. 9 is a drawing showing a reproducing light quantity control device of Second Embodiment. In First Embodiment, the reproducing light quantity range data "l" are recorded already when shipping is made from the factory. However, in the present embodiment, the range of reproducing light quantity is decided by reading test data recorded on the test region of the magneto-optical disk 1 while varying the reproducing light quantity.

First, a light quantity setting signal "k" from a CPU 10 (reproducing light quantity range deciding means) is sent to a reproducing light quantity limiting section 8 via a switching section 13. Here, the limiting operation of the reproducing light quantity limiting section 8 is turned off. This allows the reproducing light quantity to be changed from a small value at which the aperture "ap" disappears to a large value at which the record marks (long mark 101 and short mark 102) are destroyed.

A semiconductor laser 2 projects projection light "a" while the light quantity value is increased by a small increment in a wide range from a small light quantity to a large light quantity. Here, the light quantity value is changed in accordance with the light quantity setting signal "k" from the CPU 10. Here, an error calculating section 9 measures a reproducing error number "e" at each light quantity value, and the results of measurement are sent to the CPU 10. Also, at the same time, the amplitude ratio "r" is sent to a CPU 19 from a dividing section 11.

The error number "e" and the amplitude ratio "r" at each light quantity value are stored in the CPU 10. In the domain of small light quantity, as the light quantity becomes smaller, the aperture "ap" becomes excessively small, and the error number "e" is increased in accordance with the reduction in S/N ratio. In the domain of large light quantity, as the light quantity becomes large, the record marks are destroyed further, and the error number "e" is increased. Thus, the light quantity values at which error number "e" is not less than a predetermined value are set to the upper limit value and the lower limit value, respectively.

Also, a target amplitude ratio "f" at which the error number "e" is minimum is determined. The upper limit value and the lower limit values are sent as reproducing light quantity range data "l'" to the reproducing light quantity limiting section 8. The reproducing light quantity limiting section 8 carries out the following limiting operation of the reproducing light quantity in accordance with the upper limit value and the lower limit value as represented by the reproducing light quantity range data "l'". The reproducing light quantity limiting section 8 also limits the reproducing light quantity using the target amplitude ratio "f". Note that, because other operations are the same as the ones explained in FIG. 1 of First Embodiment, explanations thereof are omitted.

Figure 10:
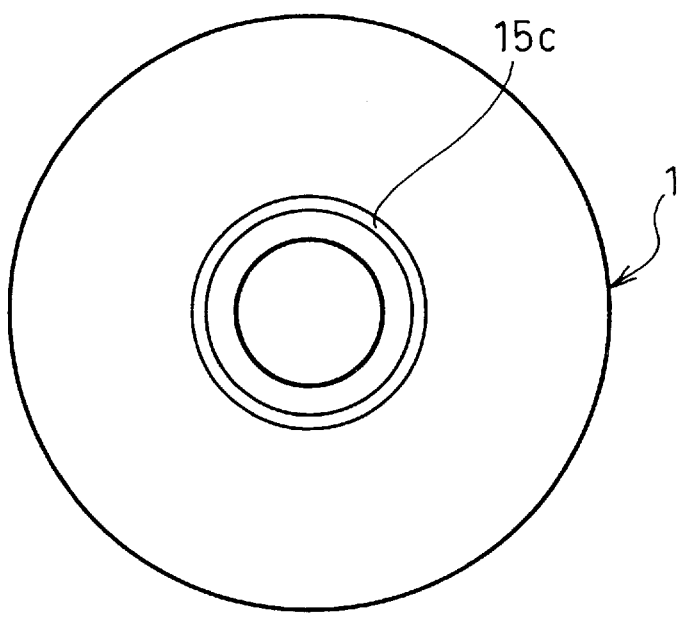
FIG. 10 is an explanatory drawing showing a recording region of the magneto-optical disk of FIG. 9.

FIG. 10 is a drawing showing a magneto-optical disk 1 used in the described operations. On a read-in on the inner periphery of the magneto-optical disk 1, a test region 15*c* is provided, and test data are pre-recorded thereon. The test data in the test region 15*c* are reproduced while increasing the light quantity value by a small increment in a wide range from a small light quantity to a large light quantity so as to determine the upper limit value and the lower limit value of the light quantity. Note that, because the test data may be destroyed with a large light quantity, it is preferable to increase the light quantity sequentially from a small quantity to a large quantity. Also, in the case of determining the upper limit value and the lower limit value again, the test data are recorded again beforehand so that the test can be carried out accurately every time.

Figure 11:
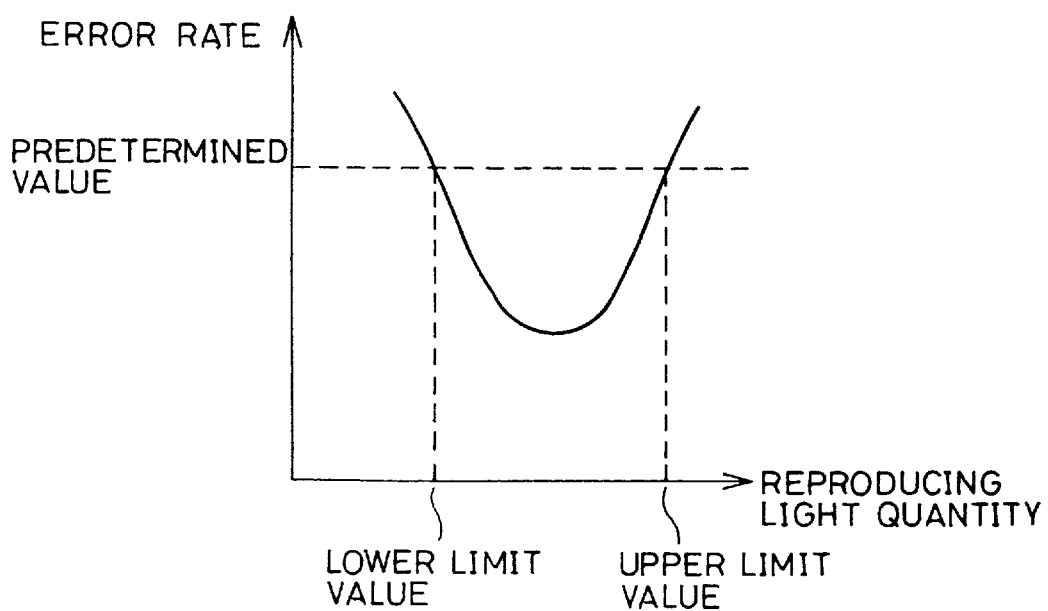
FIG. 11 is a graph explaining an upper limit value and a lower limit value of reproducing light quantity of the reproducing light quantity control device of FIG. 9.

FIG. 11 is a drawing showing the relationship between the reproducing light quantity and the error rate in the described operations, wherein the horizontal axis indicates reproducing light quantity and the vertical axis indicates error rate. In the domain of not more than the lower limit value of the reproducing light quantity at which the error rate exceeds a predetermined value, no aperture is generated in the reproducing layer 1*b* of the magneto-optical disk 1. Also, in the domain of not less than the upper limit value of the reproducing light quantity, the recorded data of the recording layer 1*a* are destroyed. Thus, by determining the reproducing light quantity values at which the error number "e" is not more than a predetermined value, it is possible to decide the range of the reproducing light quantity.

Figure 12:
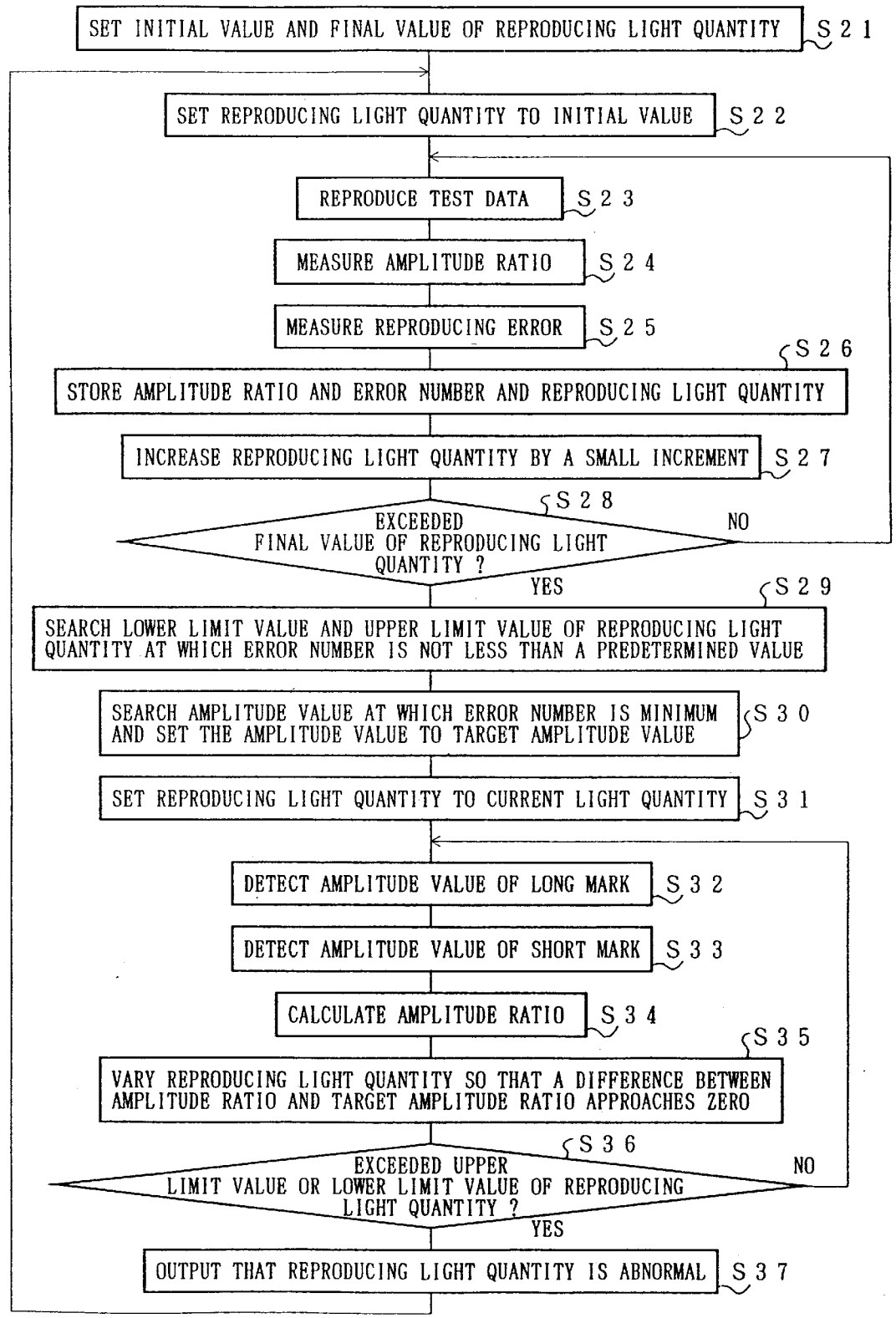
FIG. 12 is a flowchart showing an operation of the reproducing light quantity control device of FIG. 9.

FIG. 12 is a flowchart of the described operations.

The flowchart of FIG. 12 differs from that of First Embodiment of FIG. 8 only on S1 to S10 which are replaced with S21 to S29, and since the operations of S31 to S37 are the same as the operations of S11 to S17 of FIG. 8, explanations thereof will be omitted.

First, in S21, an initial value and a final value of the reproducing light quantity are set so as to determine the range of light quantity for determining the upper limit value and the lower limit value. Here, the light quantity on the larger side is set so as not to reach the temperature which deteriorates the reproducing layer 1*b* and the recording layer 1*a*.

Then, in S22, the reproducing light quantity is set to the initial value, and the test data are read out is S23, and the amplitude ratio "r", is measured in S24, and the error rate is measured in S25. In S26, the amplitude ratio "r" and the error number "e" of the current reproducing signal are stored.

Then, in S27, the reproducing light quantity is increased by a small increment, and it is judged in S28 whether the reproducing light quantity has exceeded the final value. When it is judged that the reproducing light quantity has not exceeded the final value, the sequence returns to S23. When it is judged that the reproducing light quantity has exceeded the final value, in S29, an error number "e" which is not more than a predetermined error number "e" is searched from error numbers "e" previously stored, and the light quantities at this error number "e" are set to the lower limit value and the upper limit value and stored. In S30, a minimum value is searched from the error numbers "e" previously stored, and the associated amplitude ratio "r" is set to the target amplitude ratio "f".

Then, in S31, the reproducing light quantity is set to the current light quantity value, and in the following, as in First Embodiment, the reproducing light quantity is limited in the range of the upper limit value and the lower limit value thus set. Note that, the upper limit value, the lower limit value, and the target amplitude ratio "f" may be determined by measuring the jitter value of the reproducing signal instead of the error number "e".

As a result, it is possible to determine an accurate upper limit value and lower limit value of the reproducing light quantity for each magneto-optical disk 1. Also, even when the environment temperature is changed, or the magneto-optical disk 1 or the present reproducing light quantity control device is deteriorated, it is possible to determine an accurate upper limit value and the lower limit value of the reproducing light quantity every time such incident occurs. Namely, although, compared with First Embodiment, it takes more steps to determine the upper limit value and the lower limit value of the reproducing light quantity, more accurate values can be determined.

Note that, the reproducing light quantity control device of the present embodiment has an arrangement wherein the upper limit value and the lower limit value of the reproducing light quantity are limited simultaneously. However, not limiting to this, it is possible to adopt an arrangement wherein only the upper limit value of the reproducing light quantity is limited so that only the destruction of record marks are prevented. Alternatively, it is also possible to adopt an arrangement wherein only the lower limit of the reproducing light quantity is limited so as to allow the reproducing signal quantity to be continuously detected.

It is also possible to have an arrangement wherein the upper limit value and the lower limit value determined in S30 of FIG. 12 are recorded on the reproducing light quantity range data recording region 15a of FIG. 4. In this case, recording is carried out by the effect of magnetic inversion of the magneto-optical recording instead of the recording, as in First Embodiment, in the form of raised areas and land which does not permit erasing. With this arrangement, when the magneto-optical disk 1 is inserted again, it is possible to omit unnecessary operations in determining the upper limit value and the lower limit value of the reproducing light quantity.

[Third Embodiment]

Figure 13:
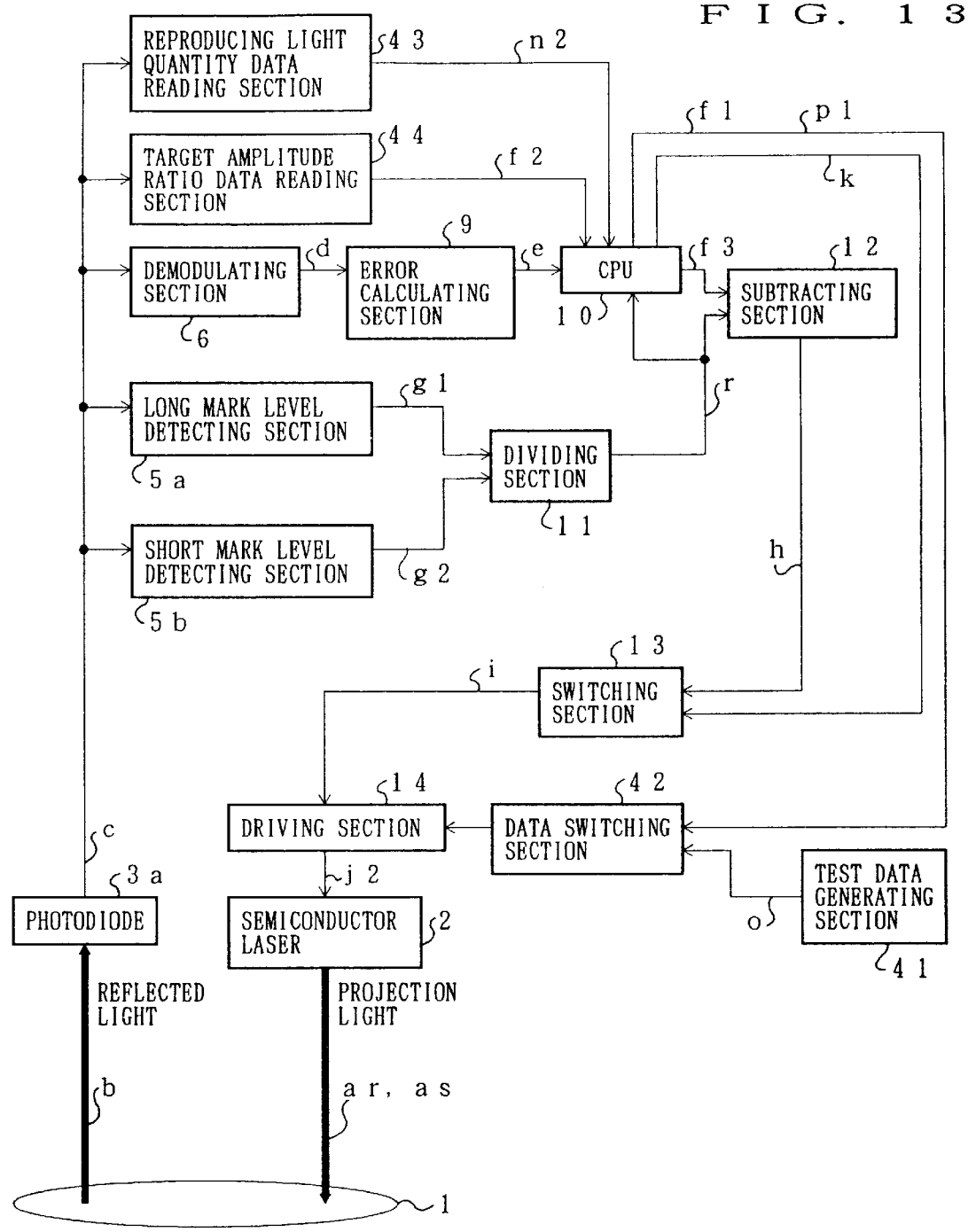
FIG. 13 is a block diagram showing a reproducing light quantity control device of an optical memory device in accordance with yet another embodiment of the present invention.
Figure 14:
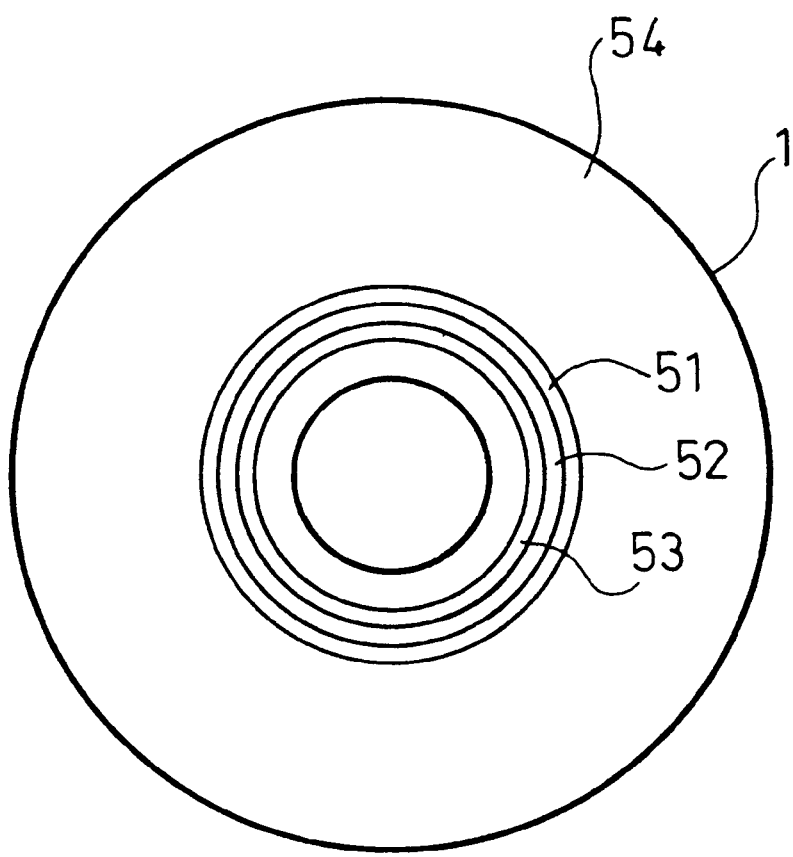
FIG. 14 an explanatory drawing showing each region of the magneto-optical disk of FIG. 13.
Figure 15:
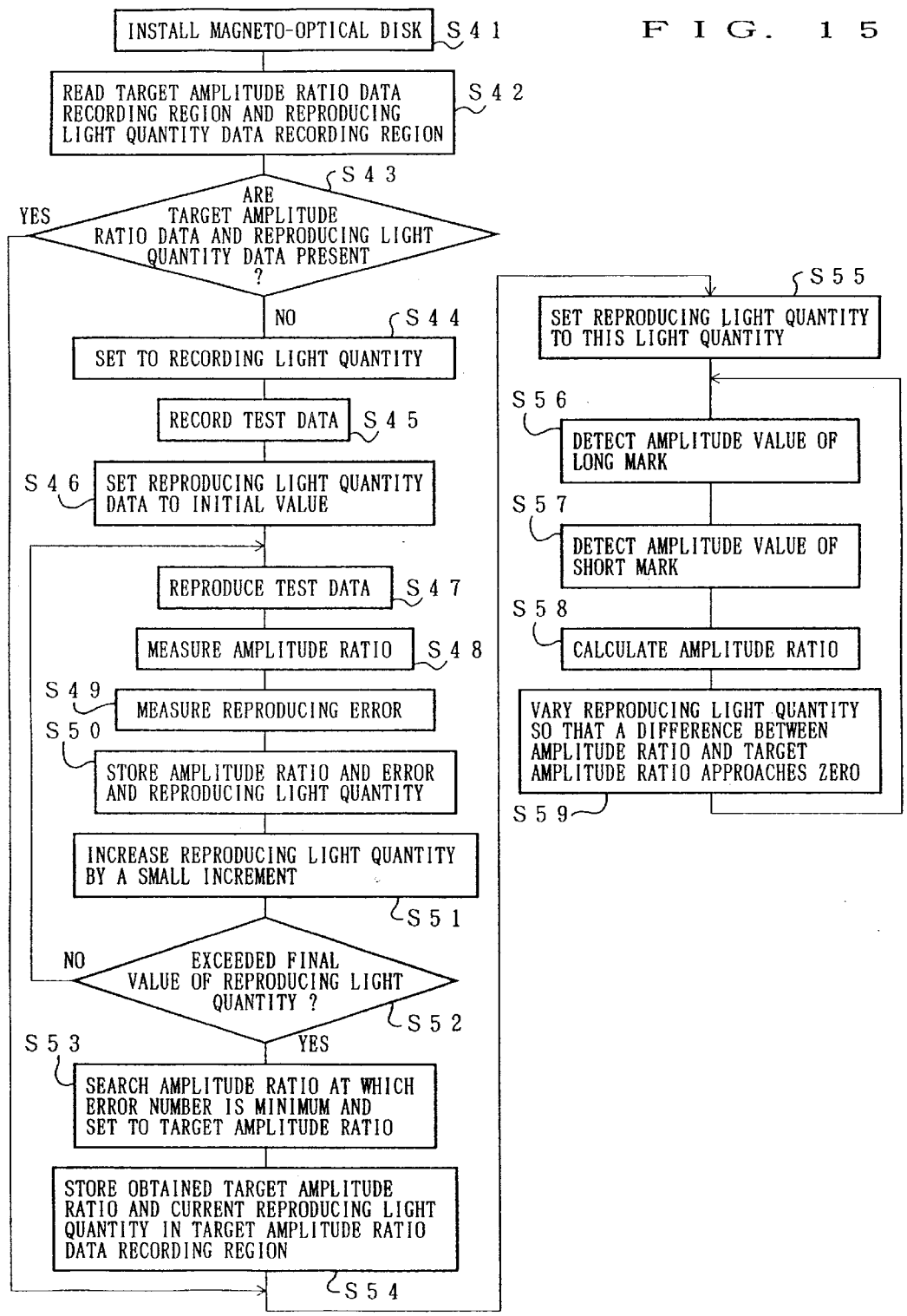
FIG. 15 is a flowchart showing an operation of the reproducing light quantity control device of FIG. 13.

The following will describe yet another embodiment of the present invention referring to FIG. 13 through FIG. 15. Note that, for convenience of explanation, means having the same functions as that indicated in the drawings of First and Second Embodiment are given the same reference numerals and explanations thereof are omitted.

FIG. 13 is a drawing explaining a reproducing light quantity control device of the present embodiment. First, an operation of determining target values of a reproducing light quantity control and recording the target values onto a magneto-optical disk 1 will be described.

A light pick-up including the semiconductor laser 2 and the photodiode 3 is moved to a test data recording region 51 (details will be described later referring to FIG. 14) of the magneto-optical disk 1. Test data "o" outputted from a test data generating section 41 (test data recording means) are selected by a data switching section 42 (test data recording means), and are sent to the driving section 14. Also, a light quantity setting signal "k" from a CPU 10 is sent to the driving section 14 via the switching section 13, and the light quantity of projection light from the semiconductor laser 2 is set to a recording light quantity. Then, a driving current $j_2$ is sent to the semiconductor laser 2 from the driving section 14, and by recording projection light "ar", the test data "o" is recorded on the test data recording region 51 of the magneto-optical disk 1.

Then, the CPU 10 outputs the light quantity setting signal "k", and the light quantity of the projection light from the semiconductor laser 2 is set to a reproducing light quantity in accordance with the light quantity setting signal "k". When reproducing projection light "as" is projected on the magneto-optical disk 1, as described, a magnetic aperture "ap" is generated, and record marks (long mark 101 and short mark 102) are read out.

A read signal "c" from the photodiode 3b is sent to a reproducing light quantity data reading section 43 (reproducing light quantity value reading means), a target amplitude ratio data reading section 44 (target value reading means), a demodulating section 6, a long mark level detecting section 5a (signal quantity detecting means), and a short mark level detecting section 5b (signal quantity detecting means).

The test data "o" demodulated by the demodulating section 6 is inputted to the error calculating section 9 (reproducing signal measuring means), and an error number "e" is calculated so as to evaluate the quality of the reproducing signal, and the result of calculation is sent to the CPU 10. The long mark level detecting section 5a outputs a long mark amplitude value $g_1$, and in the same manner, the short mark level detecting section 5b outputs a short mark amplitude value $g_2$. The dividing section 11 (signal quantity detecting means) outputs an amplitude ratio "r" of the long mark amplitude value $g_1$ to the short mark amplitude value $g_2$.

The CPU 10 outputs the light quantity setting signal "k", and increases the reproducing light quantity of the projection light from the semiconductor laser 2 by a small increment. Namely, the CPU 10 measures the error number "e" and the amplitude ratio "r" while increasing the reproducing light quantity by a small increment step by step. The CPU 10 stores an amplitude ratio "r" of when the measured error number "e" is minimum or not more than a predetermined value, and sends a target amplitude ratio data $f_1$ to be the control target value of the reproducing light quantity to the data switching section 42. Also, the CPU 10 outputs the associated reproducing light quantity value, as reproducing light quantity data $p_1$, to the data switching section 42 together with the target amplitude ratio $f_1$.

Then, the light pick-up is moved to a target amplitude ratio data recording region 52 (details will be described later referring to FIG. 14) of the magneto-optical disk 1. The data switching section 42 selects the target amplitude ratio data $f_1$ and sends thereof to the driving section 14. The CPU 10 sends the light quantity setting signal "k" to the driving section 14 via the switching section 13, and the light quantity of the projection light from the semiconductor laser 2 is set to the recording light quantity. Then, the driving current $j_2$ is sent to the semiconductor laser 2 from the driving section 14, and by the recording projection light "ar", the target amplitude ratio data $f_1$ are recorded on the target amplitude ratio data recording region 52 (target value recording region) of the magneto-optical disk 1. Note that, the recorded target amplitude ratio data $f_1$ become target amplitude ratio data $f_2$.

Then, the light pick-up is moved to a reproducing light quantity data recording region 53 (details will be described later referring to FIG. 14) of the magneto-optical disk 1. As above, the data switching section 42 selects the reproducing light quantity data $p_1$ and sends thereof to the driving section 14, and the reproducing light quantity data $p_1$ are recorded on the reproducing light quantity data recording region 53 (reproducing light quantity value recording region). Note that, the recorded reproducing light quantity data $p_1$ becomes reproducing light quantity data $p_2$.

The following describes an operation of controlling the reproducing light quantity to the target value.

A target amplitude ratio data reading section 44 reads the target amplitude ratio data $f_2$ recorded on the target amplitude ratio data recording region 52, and outputs thereof to the CPU 10. The CPU 10 sends the target amplitude ratio data $f_2$ as target amplitude ratio data $f_3$ to the subtracting section 12. Then, the light pick-up is moved to the reproducing light quantity data recording region 53 of the magneto-optical disk 1. A reproducing light quantity data reading section 43 reads the reproducing light quantity data $p_2$ recorded on the reproducing light quantity data recording region 53, and outputs thereof to the CPU 10. The CPU 10 sets the initial value for controlling the reproducing light quantity to the value of the reproducing light quantity data $p_2$, and outputs the light quantity setting signal "k".

This permits controlling of the reproducing light quantity to be started from a value close to the actual optimum light quantity, thus allowing rapid rising of the control.

Then, the light-pick-up is moved to an information recording-reproducing region 54. In this region, the control pattern composed of the long mark 101 and the short mark 102 is recorded periodically between information data. The subtracting section 12 compares the amplitude ratio "r" obtained from the read signal "c" and a target amplitude ratio data $f_3$, and outputs a light quantity control signal "h" so that the difference between the amplitude ratio "r" and the target amplitude ratio data $f_3$ approaches zero.

With the described operations, the reproducing light quantity is controlled in accordance with the target amplitude ratio data $f_2$ which have been read out from the target amplitude ratio data recording section 52 of the magneto-optical disk 1, and the number of errors in the reproducing data can be reduced. Also, when the magneto-optical disk is installed again, the operation of measuring the error rate can be omitted by reading of the target amplitude ratio data $f_2$, allowing a quick transition to the recording and reproducing operation of information data.

FIG. 14 is a drawing explaining the magneto-optical disk 1.

The recording layer 1a of the magneto-optical disk 1 is made from a perpendicular magnetization film made of an alloy of rare earth metal and transition metal, and digital information is recorded in accordance with the direction of perpendicular magnetization. The reproducing layer 1b is made of a thin film alloy of rare earth metal and transition metal. Also, the reproducing layer 1b is a magnetic film which, in accordance with the selection of the composition ratio, has in-plane magnetization from room temperature to a curie temperature, and in which transferring of the perpendicular magnetization of the recording layer 1a occurs at a temperature of not less than the curie temperature.

The magneto-optical disk 1 is provided with the test data recording region 51, the target amplitude ratio data recording region 52, the reproducing light quantity data recording region 53, and the information recording-reproducing region 54.

On the inner periphery side of the magneto-optical disk 1, the test data recording region 51 is provided, and the test data "o" are recorded thereon. The error rate and the amplitude ratio "r" are measured by reading the test data "o" while increasing the reproducing light quantity by a small increment step by step. As a result, an optimum amplitude ratio "r" is decided.

On the target amplitude ratio data recording region 52 (target amplitude ratio data recording region) in a vicinity of the test data recording region 51, the target amplitude ratio data $f_2$ (target amplitude ratio data $f_1$) are recorded. Once the target amplitude ratio data $f_2$ are recorded, in the following operations with the magneto-optical disk 1 re-installed, the controlling of reproducing light quantity can be started quickly only by reading the target amplitude ratio data $f_2$, thus omitting the measuring operation of the error rate.

On the reproducing light quantity data recording region 53 (reproducing light quantity data recording region) in a vicinity of the target amplitude ratio data recording region 52, the reproducing light quantity data $p_2$ (reproducing light quantity data $p_1$) are recorded. When the reproducing light quantity data $p_2$ (reproducing light quantity data $p_1$) are read out and are set to the initial value for controlling the reproducing light quantity, it is possible to start the operation of controlling the reproducing light quantity from a value close to the actual optimum light quantity, thus allowing rapid rising of the control.

Note that, in the magneto-optical disk 1, the target amplitude ratio data recording region 52 and the reproducing light quantity data recording region 53 are positioned in a vicinity of the test data recording region 51. This arrangement minimizes the moving amount of the light pick-up, thus allowing a quick transition from the operation of determining the target amplitude ratio to the recording operation of the target amplitude ratio data and the reproducing light quantity data.

On the information recording-reproducing region 54, a control pattern composed of the long mark 101 and the short mark 102 is recorded periodically between information data. In the reproducing light quantity control device, the amplitude ratio "r" as a signal quantity of the control pattern is detected while reproducing the information data, and the controlling of reproducing light quantity is continuously carried out so that the amplitude ratio "r" approaches the target amplitude ratio.

FIG. 15 is a flowchart explaining the control method of the reproducing light quantity control device of FIG. 1.

In FIG. 15, S41 to S43 are steps for installing the magneto-optical disk 1 and reading the target amplitude ratio data, S44 to S54 are steps for deciding and recording the target amplitude ratio, and S55 to S59 are steps for controlling the reproducing light quantity.

When the magneto-optical disk 1 is installed in the optical memory device in S41, the target amplitude ratio data recording region 52 on the inner periphery of the magneto-optical disk 1 is read out in S42. Then, in S43, with respect to the output signal thus read out, it is judged whether the target amplitude ratio data $f_2$ and the associated reproducing light quantity data $p_2$ are recorded.

When it is judged in S43 that data are present, the sequence goes to S55. As a result, the operation of deciding and recording the target amplitude ratio from S44 to S54 is omitted.

In S55, the light quantity of the reproducing projection light "as" is set to the reproducing light quantity read out in S42. As a result, it is possible to start the reproducing light quantity control from a light quantity close to the optimum reproducing light quantity, thus allowing rapid rising of the control.

In S56, the amplitude value of the recorded region of the long mark 101 is detected from the control pattern periodically recorded on the information recording-reproducing region 54. In S57, the amplitude value of the recorded region of the short mark 102 is detected.

Then, in S58, the ratio of the amplitude value of the long mark 101 to the amplitude value of the short mark 102 is calculated so as to obtain the amplitude ratio "r". In S59, the reproducing light quantity is varied so that the difference between the amplitude ratio "r" and the target amplitude ratio (target amplitude ratio data $f_3$) approaches zero. Then, the sequence returns to S56, and the following control of reproducing light quantity is repeated.

When the target amplitude ratio data $f_2$ and the reproducing light quantity data $p_2$ are not recorded in S43, first, in S44, the projection light is set to the recording projection light "ar".

Then, in S45, the test data "o" is recorded on the test data recording region 51 of the magneto-optical disk 1. The test data "o" includes (i) random data for measuring an error and (ii) a control pattern, composed of the long mark 101 and the short mark 102, for measuring the amplitude ratio "r".

In S46, the projection light is set to the initial value of the reproducing light quantity. In S47, the control pattern and the teat data "o" are reproduced. In S48, the amplitude ratio "r" of the control pattern is measured, and in S49, the error rate of the control pattern is measured. In S50, (a) the amplitude ratio "r" and the error number "e" of the current reproducing signal and (b) the reproducing light quantity are stored.

Then, in S51, the reproducing light quantity is increased by a small increment step by step in a plurality of light quantities, and in S52, it is judged whether the reproducing light quantity has exceeded the final value of the test range of the reproducing light quantity. When it is judged that the reproducing light quantity has not exceeded the final value, the sequence returns to S47. When it is judged that the reproducing light quantity has exceeded the final value, in S53, a minimum value or a value of not more than a predetermined value is searched from the error numbers "e" previously stored, and the associated amplitude ratio "r" is decided to be a target amplitude ratio (target amplitude ratio data $f_1$).

In S54, the target amplitude ratio data $f_1$ thus obtained and the associated reproducing light quantity are recorded in the target amplitude ratio data recording region 52. Then, the sequence goes to S55, and in the described manner, controlling of the reproducing light quantity is carried out in accordance with the decided target amplitude ratio.

Note that, in the present embodiment, since means for recording the test data "o" is provided, even when the recording characteristics are changed with time after shipping of the magneto-optical disk 1 from the factory, optimum test data "o" can be regularly recorded in the optical memory device of a user, and the target amplitude ratio data $f_1$ are updated.

Also, in the present embodiment, in order to determine the target amplitude ratio, the error number "e" of the test data "o" is measured while increasing the reproducing light quantity by a small increment in a plurality of light quantity values. However, not limiting to this, it is possible to measure the jitter of the reproducing signal, and the amplitude ratio "r" at which the measured jitter value is minimum or not more than a predetermined value may be set to the target amplitude ratio. This is possible and the reproducing light quantity can be controlled as above because the error number is substantially proportional to the jitter value.

Also, in the present embodiment, the target amplitude ratio data $f_1$ are recorded by the magneto-optical recording system. However, not limiting to this, the target amplitude ratio data $f_1$ may be recorded beforehand, when shipping is made from the factory, in the form of raised areas and land which does not permit erasing. In this case, the measuring section of the error rate and the deciding section of the target amplitude ratio can be excluded from the optical memory device of the user.

Further, in the magneto-optical disk 1, the target amplitude ratio and the reproducing light quantity are recorded on the same target amplitude ratio data recording section 52. However, not limiting to this, a separate reproducing light quantity recording region may be provided, and recording light quantity when the target amplitude ratio is obtained may be recorded on this region.

As described, in a reproducing light quantity control method for an optical memory device of the present invention is characterized by including the steps of (1) recording test data on an optical recording medium; (2) reproducing the test data recorded on the optical recording medium by changing a reproducing light quantity in a plurality of light quantity values, the reproducing light quantity being a light quantity of when reproducing; (3) measuring a quality value and a signal quantity of each of a plurality of reproducing signals from the test data at the plurality of light quantity values; (4) selecting an optimum reproducing signal quantity from a plurality of reproducing signal quantities in accordance with quality values of the plurality of reproducing signals so as to decide a target value of reproducing signal quantity; and (5) recording the target value on a target value recording region of the optical recording medium.

With this method, once the target value is recorded on the optical recording medium, in the following, when the optical recording medium is installed in the optical memory device, the measuring operation of the error rate can be omitted. Also, after reading the target value recorded in the target value recording region, it is possible to start the control of reproducing light quantity instantly in accordance with the target value thus read, thereby suppressing the error in the reproducing data.

Namely, the transition to the recording-reproducing operation of information data can be made rapidly.

Also, with the above method, when the target value is decided beforehand at the time of shipping the optical recording medium from the factory, and the target value is recorded in the target value recording region, when the optical recording medium shipped is installed in the optical memory device of the user, the transition to the information recording-reproducing operation can be made instantly.

Also, the above reproducing light quantity control method may include further the steps of (6) reading the target value recorded on the target value recording region, and (7) reproducing marks recorded on the optical recording medium by projection of reproducing light so as to control the reproducing light quantity in such a manner that reproducing signal quantities from the marks approaches the target value.

The above reproducing light quantity control method including the steps of (6) and (7) may include the step of recognizing presence or absence of recording of the target value in the target value recording region of the optical recording medium, wherein when the target value is not recorded, processes following the step (1) are carried out, and when the target value is recorded, processes following the step (6) are carried out.

Also, in the above reproducing light quantity control method, the optical recording medium may include a reproducing layer and a recording layer, and in a reproducing operation, a light beam is projected onto the optical recording medium and an aperture having a diameter smaller than a light spot diameter of the light beam is generated in the reproducing layer so as to reproduce information recorded on the recording layer.

Further, a reproducing light quantity control device for an optical memory device of the present invention is characterized by including projecting means, capable of changing a projection light quantity, for projecting light onto an optical recording medium; signal quantity detecting means for detecting signal quantities of a plurality of reproducing signals from marks recorded on the optical recording medium, the plurality of reproducing signals resulting from a change in the projection light quantity; reproducing signal measuring means for measuring quality values of the plurality of reproducing signals; target value deciding means for deciding a target value of an optimum reproducing signal quantity in accordance with the quality values of the plurality of reproducing signals; and control means for carrying out (i) a control operation for changing a projection light quantity of the projecting means and (ii) an operation of recording the target value on the target value recording region of the optical recording medium by the projecting means.

With this arrangement, it is possible to decide the target value in accordance with the values of reproducing signal qualities such as error rate or jitter, and record the target value in the target value recording region. Once the target value is recorded in the target value recording region, in the following, even when the optical recording medium recording the target value is installed in another optical memory device, the control of reproducing light quantity is carried out instantly by reading of the target value, thus allowing a quick transition to the recording-reproducing operation of information data.

Also, the above reproducing light quantity control device may include test data recording means for recording test data on the optical recording medium by the projecting means, wherein the signal quantity detecting means detects signal quantities of a plurality of reproducing signals from the test data, the plurality of reproducing signals resulting from a change in the projection light quantity, and the reproducing signal measuring means measures quality values of the plurality of reproducing signals from the test data.

With this arrangement, even when the recording characteristics of the optical recording medium are changed with time, it is possible to regularly record the test data in the optical memory device of the user, and update the data of the target value.

Also, the above reproducing light quantity control device may have an arrangement wherein the control means records on the optical recording medium the target value together with a reproducing light quantity value of when the target value is obtained.

With this arrangement, since the initial value for controlling the reproducing light quantity can be set to this reproducing light quantity, it is possible to start the control from a value close to the reproducing light quantity actually required, thus allowing quick rising of the reproducing light quantity control.

Further, another reproducing light quantity control device for an optical memory device of the present invention which projects a light beam on an optical recording medium including a reproducing layer and a recording layer and generates an aperture having a smaller diameter than a light spot diameter in the reproducing layer so as to reproduce information recorded on the recording layer, wherein a target value of reproducing signal quantity is recorded in a target value recording region of the optical recording medium, is characterized by including projecting means, capable of changing a projection light quantity, for projecting light onto the optical recording medium; target value reading means for reading a target value of reproducing signal quantities recorded on the optical recording medium from a reproducing signal from the optical recording medium; signal quantity detecting means for detecting reproducing signal quantities from marks recorded on the optical recording medium; and control means for controlling a reproducing light quantity from the projecting means, which is a light quantity of when reproducing, so that the reproducing signal quantities detected by the signal quantity detecting means approach the target value.

With this arrangement, when an optical recording medium on which the target value has been pre-recorded in the target value recording region is installed, the control of reproducing light quantity is carried out instantly by reading of the target value, thus allowing a quick transition to the recording-reproducing operation of information data.

Also, the above reproducing light quantity control device may have an arrangement wherein a reproducing light quantity of when the target value is obtained is recorded on the optical recording medium, and include reproducing light quantity value reading means for reading the reproducing light quantity value from the reproducing signal from the optical recording medium, the control means setting an initial value in controlling the reproducing light quantity to a reproducing light quantity value read by the reproducing light quantity value reading means.

With this arrangement, since the initial value for controlling the reproducing light quantity can be set to this reproducing light quantity, it is possible to start the control from a value close to the reproducing light quantity actually required, thus allowing quick rising of the reproducing light quantity control.

Further, an optical recording medium of the present invention including a reproducing layer and a recording layer, in which information recorded on the recording layer is reproduced by generating on the reproducing layer an aperture having a diameter smaller than a light spot diameter generated by projection of a light beam, is characterized by including a target value recording region on which a target value of reproducing signal quantities is recorded, the target value for controlling a light quantity of when reproducing, the reproducing signal quantities detected by marks recorded on the optical recording medium, wherein a reproducing light quantity which has been controlled so that the reproducing light quantities from the marks approach the target value is projected.

With this arrangement, it is possible to decide the target value in accordance with reproducing signal quality values such as error rate or jitter, and record the target value in the target value recording region. The recording is carried out by the manufacturer before shipping or by the user owning the optical memory device. When the optical recording medium on which the target value is recorded is installed in the optical memory device, the control of reproducing light quantity is carried out instantly by reading of the target value, thus allowing a quick transition to the recording-reproducing operation of information data.

Also, the above optical recording medium may have an arrangement including test data recording region for recording test data for deciding the target value, the target value recording region being positioned in a vicinity of the test data recording region.

With this arrangement, since the target value can be recorded by moving to the target value recording region immediately after deciding the target value in accordance with the test data of the test data recording region, it is possible to minimize the amount of movement by the light pick-up, thus allowing a quick transition from the deciding operation of the target value to the recording operation of the target value.

Further, the above optical recording medium may have an arrangement including a reproducing light quantity value recording region for recording a reproducing light quantity value of when the target value is obtained.

With this arrangement, since the initial value for controlling the reproducing light quantity can be set to this reproducing light quantity, it is possible to start the control from a value close to the reproducing light quantity actually required, thus allowing quick rising of the reproducing light quantity control.

Further, another reproducing light quantity control device for an optical memory device of the present invention which projects a light beam on an optical recording medium including a reproducing layer and a recording layer and generates an aperture having a diameter smaller than a light spot diameter in the reproducing layer so as to reproduce information recorded on the recording layer, is characterized by including signal quantity detecting means for detecting reproducing signal quantities from marks recorded on the optical recording medium; control means for controlling a reproducing light quantity of the light beam so that the reproducing signal quantities detected by the signal quantity detecting means approach a predetermined value; and reproducing light quantity limiting means for limiting the reproducing light quantity not more than an upper limit value so as to prevent a temperature of the recording layer from reaching a temperature which erases the marks.

With this arrangement, even when the reproducing signal quantities are detected mistakenly due to a defect or scratch on the disk, an increase in the reproducing light quantity is limited, and the recording marks of the recording layer of the optical recording medium are prevented from being destroyed.

Also, the above reproducing light quantity control device may have an arrangement wherein the optical recording medium records the upper limit value of reproducing light quantity, and include reproducing light quantity range data reading means for reading the upper limit value from the optical recording medium and giving the upper limit value read to the reproducing light quantity limiting means.

With this arrangement, it is possible to set an appropriate upper limit value per optical recording medium. Therefore, it is possible to prevent the situation wherein a low upper limit value is mistakenly set for an optical recording medium having a high upper limit value, and as a result narrowing the light quantity range capable of reproducing. Also, it is possible to prevent the situation wherein a high upper limit value is set for an optical recording medium having a low upper limit value, and as a result destroying the information recorded on the recording layer.

Further, the above reproducing light quantity control device may have an arrangement including reproducing signal measuring means for reproducing test data for deciding the upper limit value so as to measure qualities of reproducing signals; and reproducing light quantity range deciding means for deciding the upper limit value of the reproducing light quantity in accordance with quality values obtained from the reproducing signal measuring means, and giving the upper limit value to the reproducing light quantity limiting means.

With this arrangement, deterioration of test data when the reproducing light quantity is excessive is detected by measuring the reproducing signal qualities such as reproducing error or reproducing jitter so as to decide the upper limit value of the reproducing light quantity. By controlling the reproducing light quantity in accordance with this upper limit value, it is possible to limit an increase in the reproducing light quantity per optical recording medium, and to prevent deterioration of the semiconductor laser and destruction of the recording marks.

Also, the above reproducing light quantity control device may have an arrangement wherein the reproducing light quantity limiting means outputs an inspection signal indicative of whether the reproducing light quantity has exceeded the upper limit value.

With this arrangement, when malfunctioning of the reproducing light quantity control is generated, the upper limit value of the reproducing light quantity is set again, and a stable control of the reproducing light quantity is re-started.

Further, another reproducing light quantity control device for an optical memory device of the present invention which projects a light beam on an optical recording medium including a reproducing layer and a recording layer and generates an aperture having a diameter smaller than a light spot diameter in the reproducing layer so as to reproduce information recorded on the recording layer, is characterized by including signal quantity detecting means for detecting reproducing signal quantities from marks recorded on the optical recording medium; control means for controlling a reproducing light quantity of the light beam so that the reproducing signal quantities detected by the signal quantity detecting means approach a predetermined value; and reproducing light quantity limiting means for limiting the reproducing light quantity not less than a lower limit value so that a temperature of the reproducing layer reaches a temperature which generates the aperture.

With this arrangement, even when the reproducing light quantities are detected mistakenly due to a defect or scratch on the disk, a decrease in the reproducing light quantity is limited, and the aperture from the control pattern is prevented from disappearing, thus realizing a stable reproducing light quantity control in accordance with the reproducing signal quantities.

Also, the above reproducing light quantity control device may have an arrangement wherein the optical recording medium records the lower limit value of reproducing light quantity, and include reproducing light quantity range data reading means for reading the lower limit value from the optical recording medium and giving the lower limit value read to the reproducing light quantity limiting means.

With this arrangement, it is possible to set an appropriate lower limit value per optical recording medium. Therefore, it is possible to prevent the situation wherein a high lower limit value is mistakenly set for an optical recording medium having a low lower limit value, and as a result narrowing the light quantity range capable of reproducing. Also, it is possible to prevent the situation wherein a low lower limit value is mistakenly set for an optical recording medium having a high lower limit value, and as a result the aperture disappears and the control pattern cannot be reproduced.

Also, the above reproducing light quantity control device may have an arrangement including reproducing signal measuring means for reproducing test data for deciding the lower limit value so as to measure qualities of reproducing signals; and reproducing light quantity range deciding means for deciding a lower limit value of the reproducing light quantity in accordance with quality values obtained from the reproducing signal measuring means and giving the lower limit value to the reproducing light quantity limiting means.

With this arrangement, disappearing of aperture when the reproducing light quantity is insufficient is detected by measuring of the reproducing signal quantities such as reproducing error and reproducing jitter so as to decide the lower limit value of the reproducing light quantity. By controlling the reproducing light quantity in accordance with this lower limit value, it is possible to prevent the aperture from disappearing, and a stable reproducing light quantity control in accordance with the signal quantities read from the control pattern.

Also, the above reproducing light quantity control device may have an arrangement wherein the reproducing light quantity limiting means outputs an inspection signal indicative of whether the reproducing light quantity has become lower than the lower limit value.

With this arrangement, when malfunctioning of the reproducing light quantity control is generated, the lower limit value of the reproducing light quantity is set again, and a stable control of the reproducing light quantity is re-started.

Further, an optical recording medium of the present invention including a reproducing layer and a recording layer, on which an aperture having a diameter smaller than a spot diameter of a light beam is generated so as to reproduce information recorded on the recording layer, is characterized by including reproducing light quantity range data recording region for recording at least one of an upper limit value and a lower limit value of a light quantity of the light beam of when reproducing.

With this arrangement, it is possible to set an appropriate reproducing light quantity range per optical recording medium by reading the upper limit value or the lower limit value of the reproducing light quantity. Therefore, it is possible to prevent the situation wherein a low upper limit value is mistakenly set for an optical recording medium having a high upper limit value, and as a result narrowing the light quantity range capable of reproducing. Also, it is possible to prevent the situation wherein a low lower limit value is mistakenly set for an optical recording medium having a high lower limit value, and as a result the aperture disappears and the control pattern cannot be reproduced.

Further, the optical recording medium of the present invention including a reproducing layer and a recording layer, which generates an aperture having a diameter smaller than a spot diameter of a light beam so as to reproduce information recorded on the recording layer, is characterized by including a test region for recording test data for deciding an upper limit value or a lower limit value of a reproducing light quantity of the light beam by measuring qualities of reproducing signals.

With this arrangement, the test data recorded in the test region is reproduced, and the upper limit value and the lower limit value of the reproducing light quantity are decided by detecting disappearing of aperture when the reproducing light quantity is insufficient and deterioration of test data resulting from an increase in reproducing light quantity. By controlling the reproducing light quantity in accordance with this lower limit value, it is possible to prevent the aperture from disappearing when the reproducing light quantity is insufficient, and a stable reproducing light quantity control in accordance with the signal quantities read from the control pattern can be carried out.

Also, the upper limit value of the reproducing light quantity is decided by detecting the deterioration of test data when the reproducing light quantity is excessive. By controlling the reproducing light quantity in accordance with this upper limit value, it is possible to limit an increase in reproducing light quantity per optical recording medium, and to prevent deterioration of the semiconductor laser and destruction of the recording marks of the recording layer. Because the test data are not information data, even when the test data are destroyed in the process of deciding the upper limit value, no problem is presented. In the case of deciding the upper limit value again after the upper limit value of the reproducing light quantity is decided, the test data are recorded beforehand. This allows the upper limit value to be decided again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reproducing light quantity control device for an optical memory device which projects a light beam on an optical recording medium including a reproducing layer and a recording layer and generates an aperture having a diameter smaller than a light spot diameter in the reproducing layer so as to reproduce information recorded on the recording layer, said reproducing light quantity control device comprising:

signal quantity detecting means for detecting reproducing signal quantities from marks recorded on the optical recording medium;

control means for controlling a reproducing light quantity of the light beam so that the reproducing signal quantities detected by said signal quantity detecting means approach a predetermined value; and reproducing light quantity limiting means for limiting the reproducing light quantity not more than an upper limit value so as to prevent a temperature of the recording layer from reaching a temperature which erases the marks.

2. The reproducing light quantity control device for an optical memory device as set forth in claim 1, wherein said optical recording medium records the upper limit value of reproducing light quantity, said reproducing light quantity control device comprising:

reproducing light quantity range data reading means for reading the upper limit value from the optical recording medium and giving the upper limit value read to said reproducing light quantity limiting means.

3. The reproducing light quantity control device for an optical memory device as set forth in claim 1, comprising:

reproducing signal measuring means for reproducing test data for deciding the upper limit value so as to measure qualities of reproducing signals; and reproducing light quantity range deciding means for deciding the upper limit value of the reproducing light quantity in accordance with quality values obtained from said reproducing signal measuring means and giving the upper limit value to said reproducing light quantity limiting means.

4. The reproducing light quantity control device for an optical memory device as set forth in claim 1, wherein said reproducing light quantity limiting means outputs an inspection signal indicative of whether the reproducing light quantity has exceeded the upper limit value.

5. A reproducing light quantity control device for an optical memory device which projects a light beam on an optical recording medium including a reproducing layer and a recording layer and generates an aperture having a diameter smaller than a light spot diameter in the reproducing layer so as to reproduce information recorded on the recording layer, said reproducing light quantity control device comprising:

signal quantity detecting means for detecting reproducing signal quantities from marks recorded on the optical recording medium;

control means for controlling a reproducing light quantity of the light beam so that the reproducing signal quantities detected by said signal quantity detecting means approach a predetermined value; and reproducing light quantity limiting means for limiting the reproducing light quantity not less than a lower limit value so that a temperature of the reproducing layer reaches a temperature which generates the aperture.

6. The reproducing light quantity control device for an optical memory device as set forth in claim 5, wherein said optical recording medium records the lower limit value of reproducing light quantity, said reproducing light quantity control device comprising:

reproducing light quantity range data reading means for reading the lower limit value from the optical recording medium and giving the lower limit value read to said reproducing light quantity limiting means.

7. The reproducing light quantity control device for an optical memory device as set forth in claim 5, comprising:

reproducing signal measuring means for reproducing test data for deciding the lower limit value so as to measure qualities of reproducing signals; and reproducing light quantity range deciding means for deciding a lower limit value of the reproducing light quantity in accordance with quality values obtained from said reproducing signal measuring means and giving the lower limit value to said reproducing light quantity limiting means.

8. The reproducing light quantity control device for an optical memory device as set forth in claim 5, wherein said reproducing light quantity limiting means outputs an inspection signal indicative of whether the reproducing light quantity has become lower than the lower limit value.

9. An optical recording medium including a reproducing layer and a recording layer, on which an aperture having a diameter smaller than a spot diameter of a light beam is generated so as to reproduce information recorded on the recording layer, said optical recording medium comprising:

reproducing light quantity range data recording region for recording an upper limit value of a light quantity of the light beam of when reproducing, said upper limit value being set as an inherent value of said optical recording medium and being an upper limit value for preventing a recording mark of said recording layer from being destroyed.

10. An optical recording medium including a reproducing layer and a recording layer, on which an aperture having a diameter smaller than a spot diameter of a light beam is generated so as to reproduce information recorded on the recording layer, said optical recording medium comprising:

a test region for recording test data for deciding an upper limit value of a reproducing light quantity of the light beam by measuring quantities of reproducing signals, said upper limit value being an upper limit value for preventing a recording mark of said recording layer from being destroyed.

11. An optical recording medium including a reproducing layer and a recording layer, on which an aperture having a diameter smaller than a spot diameter of a light beam is generated so as to reproduce information recorded on the recording layer, said optical recording medium comprising:

reproducing light quantity range data recording region for recording an upper limit value and a lower limit value of a light quantity of the light beam of when reproducing, both said upper limit value and said lower limit value being set as an inherent value of said optical recording medium, said upper limit value being an upper limit value for preventing a recording mark of said recording layer from being destroyed, and said lower limit value being a lower limit value for preventing the aperture from disappearing.

12. An optical recording medium including a reproducing layer and a recording layer, on which an aperture having a diameter smaller than a spot diameter of a light beam is generated so as to reproduce information recorded on the recording layer, said optical recording medium comprising:

a test region for recording test data for deciding an upper limit value and a lower limit value of a reproducing light quantity of the light beam by measuring quantities of reproducing signals, said upper limit value being an upper limit value for preventing a recording mark of said recording layer from being destroyed, and said lower limit value being a lower limit value for preventing the aperture from disappearing.

* * * * *